United States Patent [19]

Tsushima

[11] Patent Number: 4,677,498
[45] Date of Patent: Jun. 30, 1987

[54] MULTIPLEXED COLOR VIDEO SIGNAL RECORDING AND REPRODUCING APPARATUS

[75] Inventor: Takuya Tsushima, Ayase, Japan

[73] Assignee: Victor Company of Japan, Ltd., Yokohama, Japan

[21] Appl. No.: 658,473

[22] Filed: Oct. 9, 1984

[30] Foreign Application Priority Data

Oct. 11, 1983 [JP] Japan ............................... 58-189452
Oct. 24, 1983 [JP] Japan ............................... 58-198906
Oct. 24, 1983 [JP] Japan ............................... 58-198907

[51] Int. Cl.⁴ .......................................... H04N 9/493
[52] U.S. Cl. ................................................. 358/310
[58] Field of Search ................... 358/310, 329, 12, 14, 358/27

[56] References Cited

U.S. PATENT DOCUMENTS 4,580,173 4/1986 Dischert et al. ..................... 358/310

FOREIGN PATENT DOCUMENTS 2740942 3/1979 Fed. Rep. of Germany .
3136347 3/1983 Fed. Rep. of Germany .

OTHER PUBLICATIONS

Schoenfelder, H., "Moeglichkeiten der Qualitaetsverbesserung Beim Heutigen Fernseh System," *Fernseh-und Kino-Technik*, vol. 37, No. 5. 1983, pp. 187 to 196.

Primary Examiner—Robert L. Richardson
Attorney, Agent, or Firm—Ladas & Parry

[57] ABSTRACT

A multiplexed color video signal recording and reproducing apparatus comprises a first circuit for producing a time division multiplexed signal in which one or two compressed color difference signals are multiplexed with the phase inverted for every predetermined horizontal scanning periods, a second circuit for producing a multiplexed color video signal by multiplexing the time division multiplexed signal with a non-compressed luminance signal, a third circuit for recording and reproducing the output signal of the second circuit on and from a recording medium, a comb filter circuit supplied with a reproduced signal from the third circuit, a fourth circuit for obtaining reproduced signals of the first and second color difference signals from an output reproduced time division multiplexed signal of the comb filter circuit, an encoder for producing a carrier chrominance signal from the output signals of the fourth circuit, and a fifth circuit for producing a reproduced color video signal by multiplexing the carrier chrominance signal and the reproduced luminance signal from the comb filter circuit.

11 Claims, 35 Drawing Figures

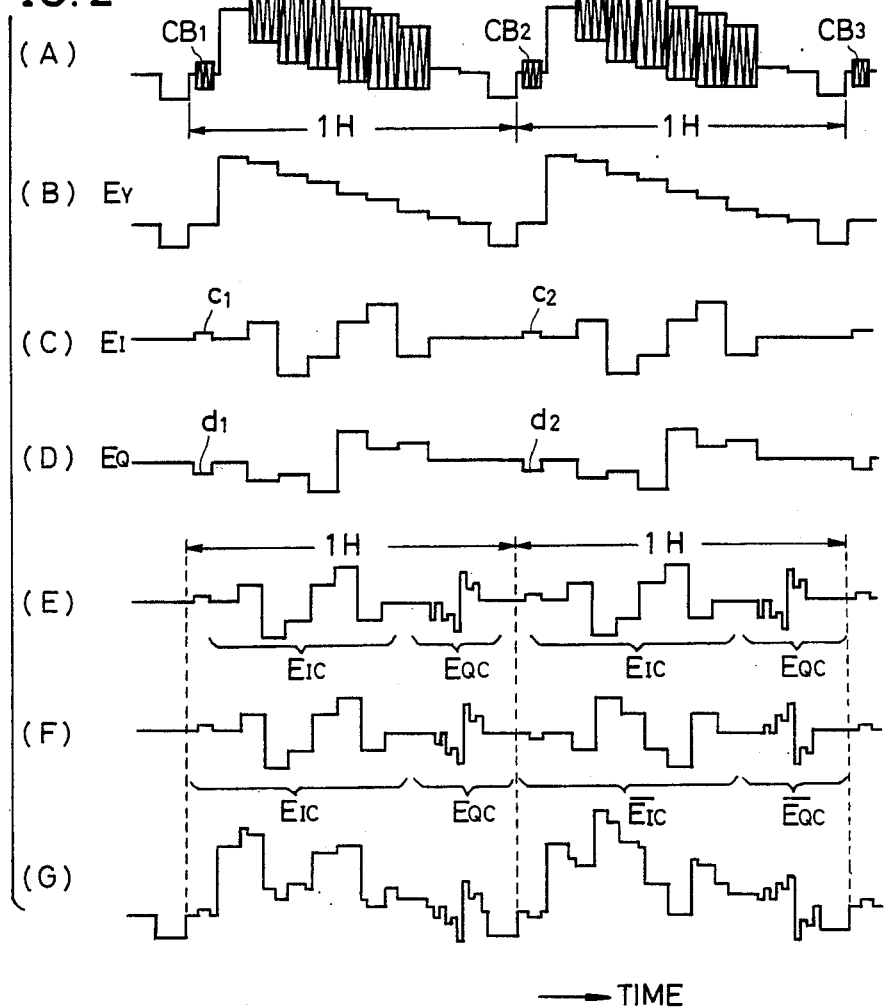

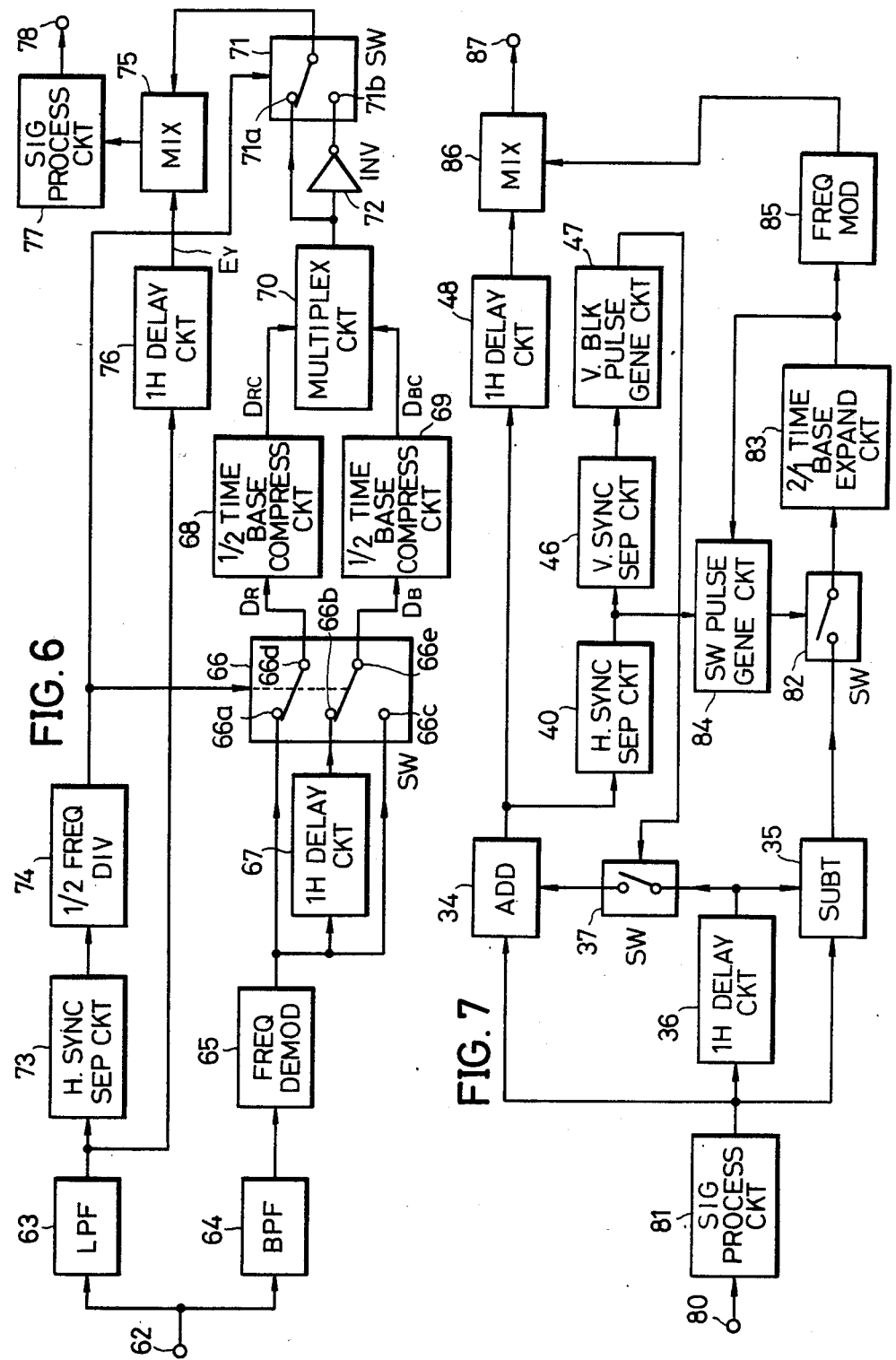

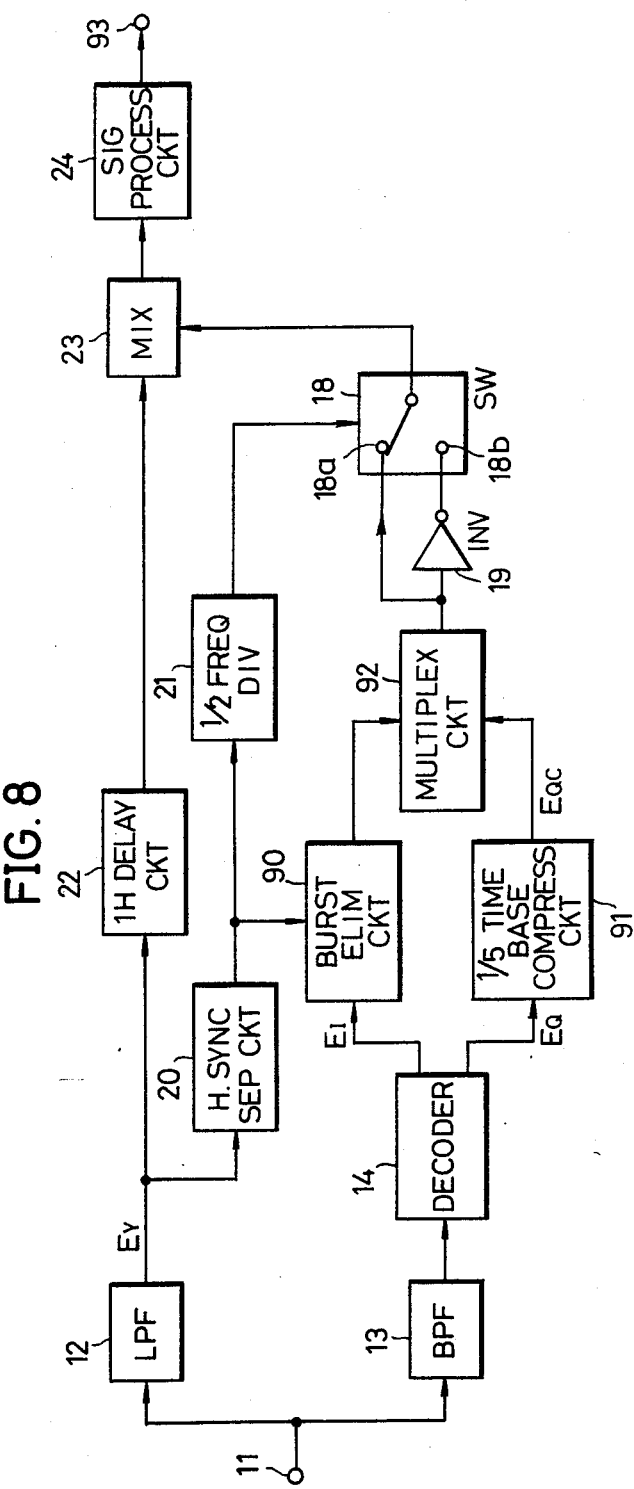

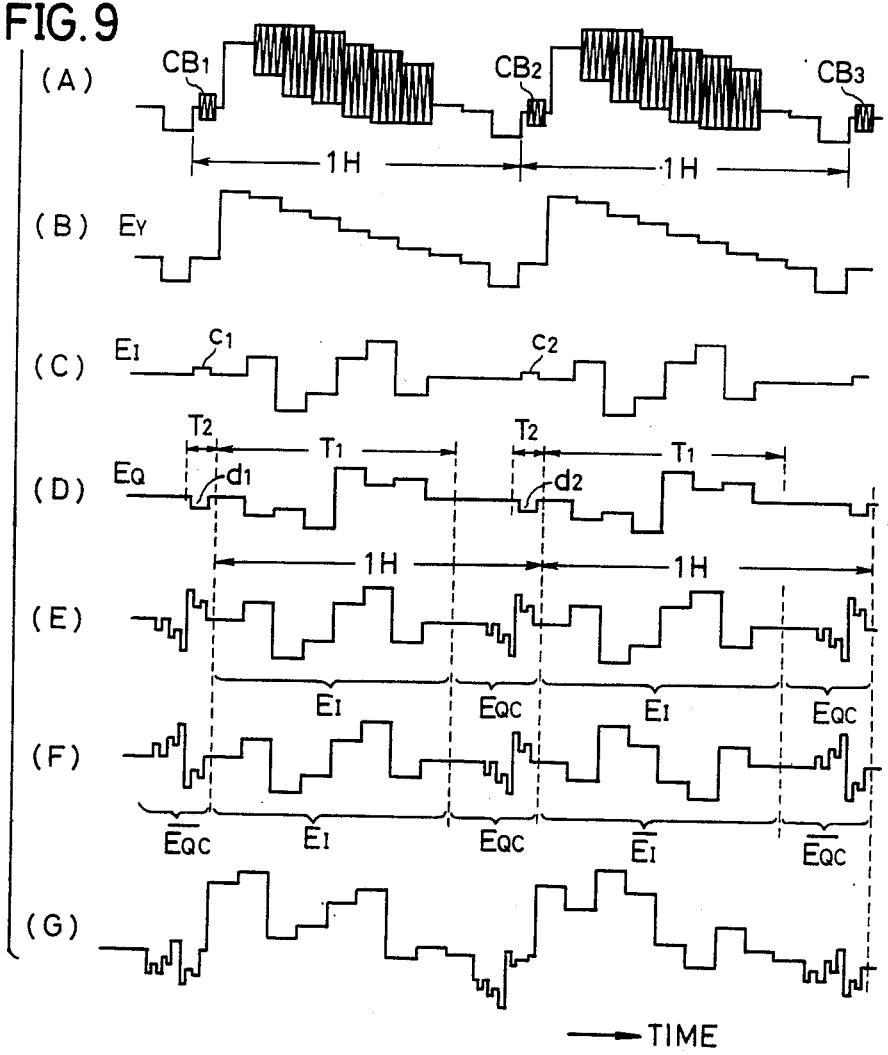

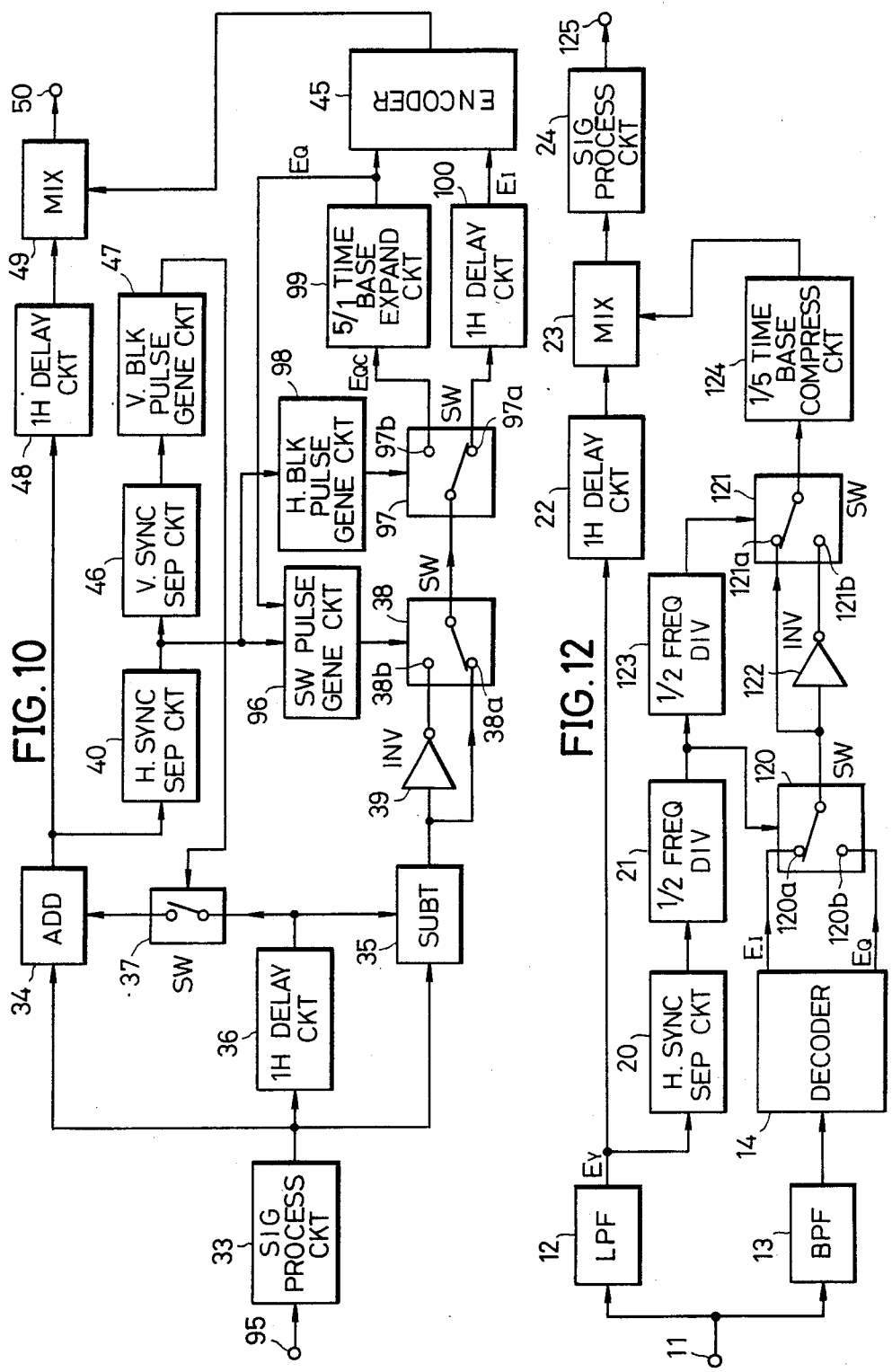

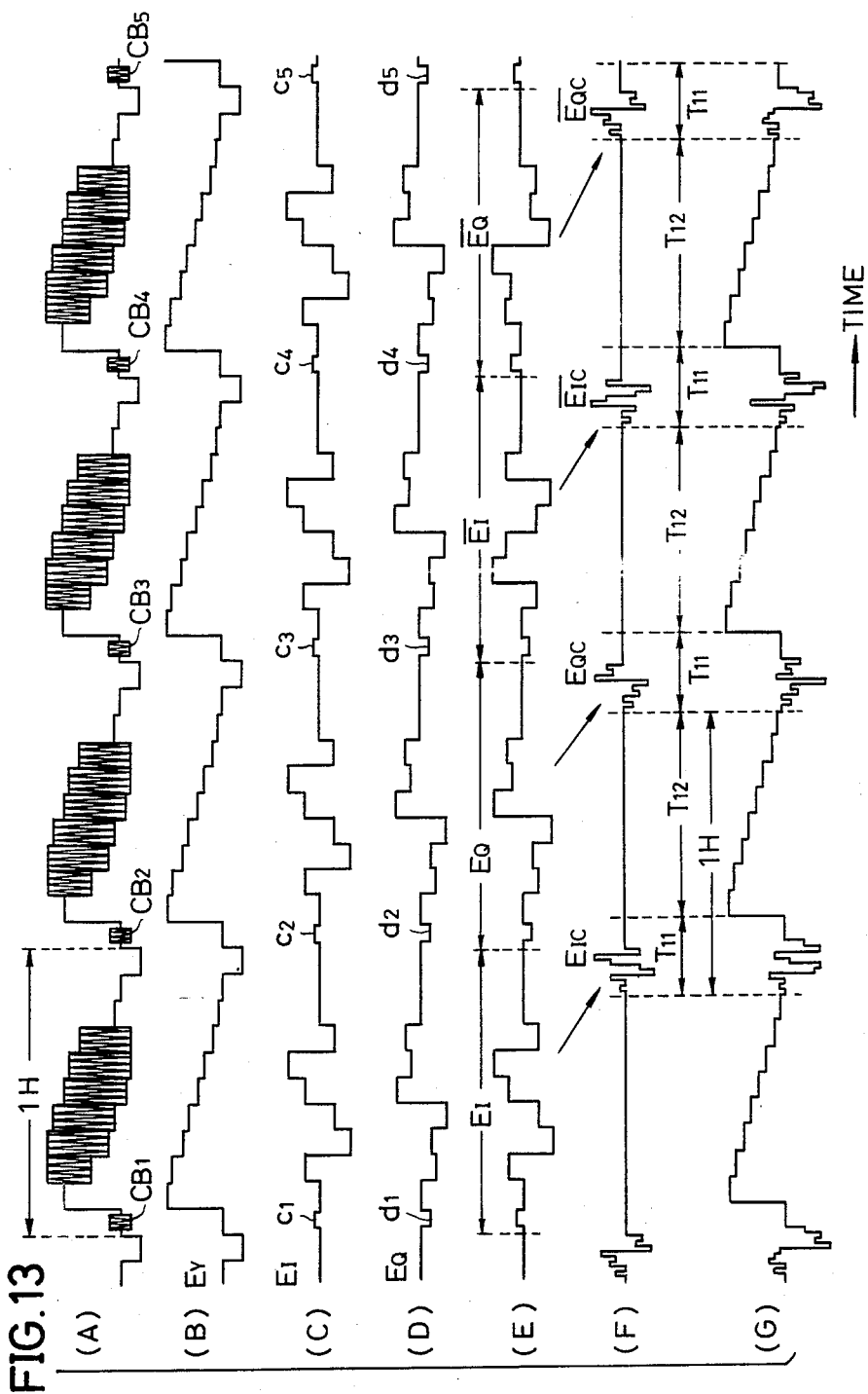

MULTIPLEXED COLOR VIDEO SIGNAL RECORDING AND REPRODUCING APPARATUS

BACKGROUND OF THE INVENTION

The present invention generally relates to multiplexed color video signal recording and reproducing apparatuses, and more particularly to a recording and reproducing apparatus which records a multiplexed signal on a recording medium at the time of a recording. The multiplexed signal is obtained by time base compressing at least one of two kinds of color difference signals, time-division-multiplexing the time base compressed color difference signal with the other color difference signal, and multiplexing the time division multiplexed signal with a luminance signal which is not subjected to a time base compression. At the time of a reproduction, the time base compressed color difference signal within the multiplexed signal which is reproduced from the recording medium, is time base expanded to the original time base. A reproduced color video signal is formed from the color difference signal which is returned to the original time base, the other color difference signal, and the luminance signal.

Among the existing color video signal recording and reproducing apparatuses such as video tape recorders (VTRs), the more popular recording and reproducing apparatuses separate a luminance signal and a carrier chrominance signal from a standard system composite color video signal. The standard system is a system such as the NTSC system, the PAL system, and the SECAM system. The separated luminance signal is frequency-modulated, and the separated carrier chrominance signal is frequency-converted into a low frequency range. The frequency converted carrier chrominance signal is frequency-division-multiplexed with the frequency modulated luminance signal and recorded on a recording medium. At the time of the reproduction, a signal processing opposite to the signal processing carried out at the time of the recording, is carried out to obtain a reproduced composite color video signal which is in conformance with the original standard system. In other words, the more popular recording and reproducing apparatuses employ the so-called low-band-conversion recording and reproducing system.

Other various recording and reproducing systems have been proposed besides the low-band-conversion recording and reproducing system. For example, there was a proposed recording and reproducing apparatus which was designed to subject two kinds of color difference signals which are obtained by frequency-demodulating the carrier chrominance signal to a time base compression, and also subject the luminance signal to a time base compression. According to this proposed recording and reproducing apparatus, the time base compressed signals are time-division-multiplexed, and the time division multiplexed signal is frequency-modulated and recorded on the recording medium. At the time of the reproduction, a signal processing opposite to the signal processing carried out at the time of the recording, is carried out to obtain a reproduced composite color video signal which is in conformance with the original standard system. An example of such a recording and reproducing apparatus may be found in the U.S. Pat. Nos. 3,781,463 and 4,245,235, for example. This proposed recording and reproducing apparatus takes into account the difference in the bands of the luminance signal and the color difference signals, and takes measures so that the color difference signals having the narrower band can be transmitted within the horizontal blanking period. In other words, one of the color difference signals which is transmitted within one horizontal scanning period (1H), is subjected to a time base compression into approximately 20% of 1H. In addition, to utilize the band effectively, the luminance signal is subjected to a time base compression into approximately 80% of 1H so as to occupy a band which is in the same range as the band of the time base compressed color difference signal, and transmitted. Further, the two color difference signals are time-division-multiplexed, as a line-sequential signal in which the two color difference signals are alternately transmitted for every 1H, with the time base compressed luminance signal. This time division multiplexed signal is supplied to a frequency modulator, and an output signal of the frequency modulator is recorded on the recording medium. At the time of the reproduction, a signal processing opposite to the signal processing carried out at the time of the recording, is carried out to obtain a reproduced composite color video signal. The recording and reproducing system employed in this proposed recording and reproducing apparatus, will hereinafter be referred to as a timeplex system.

According to the timeplex system which transmits the time-division-multiplexed signal, there is no duration in which the luminance signal and the color difference signal are transmitted simultaneously. In the case of the NTSC system color video signal and the PAL system color video signal, a mutual interference and moire may occur between the luminance signal and the color difference signals, because the luminance signal and the carrier chrominance signal are band-share-multiplexed and transmitted. However, such a mutual interference and moire will not occur according to the timeplex system. In addition, even when the color video signal of any one of the NTSC system, the PAL system, and the SECAM system is recorded by an azimuth recording and reproducing system on tracks having the horizontal synchronizing signals recorded in non-alignment between mutually adjacent tracks and then reproduced, there is substantially no crosstalk from the adjacent tracks due to the azimuth loss effect, and it is possible to obtain a reproduced picture of a high picture quality. This is because the time division multiplexed signal is recorded on the adjacent tracks in the form of a frequency modulated signal which is obtained by frequency-modulating by the time division multiplexed signal a high-frequency carrier which has a large azimuth loss effect.

The time base compressed luminance signal and the time base compressed color difference signal employed in the timeplex system, both have an energy distribution in which the energy is large in the low frequency range and the energy is small in the high frequency range. In other words, the time base compressed luminance signal and the time base compressed color difference signal assume a signal format which is suited for the frequency modulation. Thus, it is possible to obtain a large modulation index, and the signal-to-noise (S/N) ratio can be greatly improved. Moreover, it is possible to substantially eliminate a deviation in the reproducing time base when expanding the time base.

However, according to the timeplex system, the luminance signal which has a relatively wide band compared to the color difference signals, is also time base compressed and transmitted, as in the case of the color difference signals. For this reason, it is necessary to provide a complex and expensive time base compressing circuit which uses a high sampling frequency, exclusively for the luminance signal. As a result, there are problems in that the circuit construction of the recording and reproducing apparatus as a whole is complex, and the manufacturing cost of the recording and reproducing apparatus is high.

In addition, in the conventional recording and reproducing apparatus employing the timeplex system, separates a reproduced horizontal synchronizing signal from the reproduced time division multiplexed color video signal, in a synchronizing signal separating circuit. The time position of a pulse which is obtained by differentiating the separated reproduced horizontal synchronizing signal, is used as a reference to separate a reproduced time base compressed luminance signal and a reproduced time base compressed line-sequential color difference signal from the reproduced time division multiplexed color video signal. The time position of the pulse is also used as a reference to determine the starting points of write-in and read-out operations with respect to a memory so as to perform the time base expansion. Hence, a circuit must be provided to process the horizontal synchronizing signal, and the processing of the horizontal synchronizing signal is relatively troublesome to perform.

Further, the timeplex system requires a processing in which the horizontal synchronizing signal is separated from the luminance signal and is inserted into a predetermined position in the time division multiplexed color video signal so as to transmit the separated horizontal synchronizing signal as the horizontal synchronizing signal of the time division multiplexed signal. Thus, the processing of the horizontal synchronizing signal is relatively troublesome to perform. When transmitting the I-signal and the Q-signal as the color difference signals, there is a problem in that the I-signal is band-limited to the same extent as the Q-signal because the time base compression rates of the I-signal and the Q-signal are the same.

SUMMARY OF THE INVENTION

Accordingly, it is a general object of the present invention to provide a novel and useful multiplexed color video signal recording and reproducing apparatus in which the problems described heretofore are overcome.

Another and more specific object of the present invention is to provide a multiplexed color video signal recording and reproducing apparatus which records a multiplexed signal on a recording medium at the time of a recording. At least one of two kinds of color difference signals is time base compressed, and is then alternately time-division-multiplexed with the other color difference signal, so as to form a time division multiplexed signal in which the phase is inverted for every 1H or 2H, where H represents one horizontal scanning period. The time division multiplexed signal is multiplexed with a luminance signal which is not subjected to a time base compression. At the time of a reproduction, the luminance signal and the time division multiplexed signal are separated from the multiplexed signal which is reproduced from the recording medium, by use of a comb filter. The time base compressed color difference signal within the time division multiplexed signal, is time base expanded to the original time base, in a time base expanding circuit. A reproduced color video signal is formed from the color difference signal which is returned to the original time base, the other color difference signal, and the luminance signal. According to the recording and reproducing apparatus of the present invention, time base compression and expansion processes are not performed with respect to the luminance signal. Thus, the circuit construction is simplified and the manufacturing cost of the circuit is reduced, compared to the conventional timeplex system. Further, the processing of the horizontal synchronizing signal is simple compared to the conventional timeplex system which inserts the horizontal synchronizing signal separated from the luminance signal into a predetermined position of the time division multiplexed color video signal so as to transmit the separated horizontal synchronizing signal as the horizontal synchronizing signal of the time division multiplexed color video signal, because the horizontal synchronizing signal is transmitted as it is.

Still another object of the present invention is to provide a multiplexed color video signal recording and reproducing apparatus which records a multiplexed signal on a recording medium at the time of a recording. Between a first color difference signal having a bandwidth $BW_1$ and a second color difference signal having a bandwidth $BW_2$, the first color difference signal is time base compressed by $BW_1/(BW_1+BW_2)$, and second color difference signal is time base compressed by $BW_2/(BW_1+BW_2)$. The time base compressed first and second color difference signals are alternately time-division-multiplexed, so as to form a time division multiplexed signal in which the phase is inverted for every 1H, where H represents one horizontal scanning period. The time division multiplexed signal is multiplexed with a luminance signal which is not subjected to a time base compression. At the time of a reproduction, the luminance signal and the time division multiplexed signal are separated from the multiplexed signal which is reproduced from the recording medium, by use of a comb filter. The phase inversion in the time division multiplexed signal is eliminated by use of a switching circuit. The time base compressed first and second color difference signals within the time division multiplexed signal which is eliminated of the phase inversion, are time base expanded to the original time base, in time base expanding circuits. A reproduced color video signal is formed from the first and second color difference signals which are returned to the original time base, and the luminance signal. According to the recording and reproducing apparatus of the present invention,, the bands of the two kinds of color difference signals after the time base compression, can be set to a bandwidth of $BW_1+BW_2$. Hence, the I-signal will not be band-limited as in the case of the conventional timeplex system, and the I-signal can be transmitted in an essentially complete form even when the recording and reproducing band is narrow. Moreover, since the sum of the time base compression rates is equal to one, the signal parts of the two time base compressed color difference signals within respective time periods of 1H, can be transmitted within a time period of 1H of the time division multiplexed signal in a most efficient manner. In addition, the comb filter does not operate during the vertical blanking period of the reproduced luminance signal, and thus, it is possible to prevent phase distortion in the vertical synchronizing signal which has a phase which differs by H/2 between the odd and even fields.

A further object of the present invention is to provide a multiplexed color video signal recording and reproducing apparatus comprising a circuit for time base compressing a signal portion in a predetermined section of a second color difference signal having a bandwidth which is less than or equal to the bandwidth of a first color difference signal so that the time base compressed signal portion can be multiplexed within the horizontal blanking period of the first color difference signal and a luminance signal which is not subjected to a time base compression, and for obtaining a first time division multiplexed signal having a phase which is inverted for every 1H, where H represents one horizontal scanning period, means for recording and reproducing the time division multiplexed signal, a comb filter for independently separating the luminance signal and a second time division multiplexed signal solely made up of the first and second color difference signals from the reproduced time division multiplexed signal, switching means for eliminating the phase shift in the second time division multiplexed signal, a time base expanding circuit for expanding the time base of the second color difference signal within the second time division multiplexed signal, and a mixing circuit for obtaining a reproduced color video signal from outputs of the comb filter, the switching means, and the time base expanding circuit. According to the recording and reproducing apparatus of the present invention, only the Q-signal having the narrower band between the I-signal and the Q-signal, is subjected to the time base compression and is transmitted within the horizontal blanking period. Hence, the I-signal will not be band-limited as in the case of the conventional timeplex system, and the I-signal and the Q-signal can be transmitted in essentially complete forms even with a narrow recording and reproducing band. Further, according to the present invention, the luminance signal and one of the two kinds of color difference signals (for example, the I-signal) are not subjected to the time base compression, and a correlation exists between the luminance signal and the non-compressed color difference signal. For this reason, even when the correlation in the vertical direction of the picture is low, a vertical direction differentiated component of one of the luminance signal and the non-compressed color difference signal, which mixes into the other of the luminance signal and the non-compressed color difference signal as a crosstalk, can be made inconspicuous in the reproduced picture. Moreover, because the time base compressed color difference signal is multiplexed within the horizontal blanking period, a vertical direction differentiated component of the time base compressed color difference signal mixes into the luminance signal as a crosstalk, however, no problems are introduced since the noise does not appear in the reproduced picture. On the other hand, a vertical direction differentiated component of the luminance signal does not mix into the time base compressed color difference signal as a crosstalk, because the horizontal synchronizing signal has a perfect correlation in the vertical direction. Therefore, even when the vertical correlation does not exist in the picture, the noise can be greatly reduced and can be made inconspicuous in the reproduced picture. Further, the time base compression and expansion are only performed with respect to one of the color difference signals (for example, the Q-signal), and the circuit construction can be simplified since it is only necessary to provide one time base compressing circuit and one time base expanding circuit. In addition, the comb filter does not operate during the vertical blanking period of the reproduced luminance signal, and thus, it is possible to prevent phase distortion in the vertical synchronizing signal which has a phase which differs by H/2 between the odd and even fields.

Another object of the present invention is to provide a multiplexed color video signal recording and reproducing apparatus which records a multiplexed signal on a recording medium at the time of a recording. The multiplexed signal is made up of a time division multiplexed signal having a phase which is inverted for every 2H, where H represents one horizontal scanning period, and a luminance signal which is not subjected to a time base compression. The time division multiplexed signal is obtained by time base compressing a line-sequential color difference signal to an extent so that, a signal part of the line-sequential color difference signal within a section substantially equal to an effective horizontal scanning period, is substantially transmitted within the horizontal blanking period. At the time of a reproduction, two kinds of color difference signals are reproduced from a reproduced time division multiplexed signal which is separated by a comb filter. In addition, an input reproduced mulltiplexed signal of the comb filter is obtained at least during the effective horizontal scanning period, and an output reproduced luminance signal of the comb filter is obtained during the horizontal blanking period. A reproduced color video signal is obtained by multiplexing a carrier chrominance signal which is formed from the reproduced color difference signals, with the input reproduced multiplexed signal of the comb filter during the effective horizontal scanning peroid, and with the output reproduced luminance signal of the comb filter during the horizontal blanking period. According to the recording and reproducing apparatus of the present invention has the following features:

(a) Only the luminance signal is transmitted during the effective horizontal scanning period, and the time base compressed line-sequential color difference signal is transmitted within the horizontal blanking period with the phase thereof inverted for every 2H. Thus, even when there is no vertical correlation in the picture, the vertical direction differentiated component of the color difference signal does not mix into the luminance signal during the effective horizontal scanning period, because the input reproduced multiplexed signal (reproduced luminance signal) is transmitted during the effective horizontal scanning period. In addition, the vertical direction differentiated component of the color difference signal, which mixes into the luminance signal as a crosstalk during the horizontal blanking period, does not appear as noise in the reproduced picture. As a result, it is possible to improve the picture quality of the reproduced picture.

(b) There is no deterioration in the vertical resolution of the reproduced picture because the reproduced luminance signal is not obtained through the comb filter during the effective horizontal scanning period.

(c) The circuit construction can be simplified considerably when the present invention is applied to the recording and reproduction of the SECAM system color video signal, compared to the case where the present invention is applied to the recording and reproduction of the NTSC or PAL system color video signal.

(d) During the vertical blanking period, the input reproduced multiplexed signal of the comb filter is used as the reproduced luminance signal. Thus, it is possible to prevent phase distortion in the vertical synchronizing signal which has the phase which differs by H/2 between the odd and even fields.

(e) The NTSC, PAL, and SECAM system color video signals can be recorded and reproduced with a common signal format.

Other objects and further features of the present invention will be apparent from the following detailed description when read in conjunction with the accompanying drawings.

BRIEF DESCRIPTION OF THE DRAWINGS

FIGS. 2(A) through 2(G) show signal waveforms for explaining the operation of the block system shown in FIG. 1;

FIG. 6 is a systematic block diagram showing a second embodiment of a recording system in the recording and reproducing apparatus according to the present invention;

FIG. 7 is a systematic block diagram showing a second embodiment of a reproducing system in the recording and reproducing apparatus according to the present invention;

FIG. 8 is a systematic block diagram showing a third embodiment of a recording system in the recording and reproducing apparatus according to the present invention;

FIGS. 9(A) through 9(G) show signal waveforms for explaining the operation of the block system shown in FIG. 8;

FIG. 10 is a systematic block diagram showing a third embodiment of a reproducing system in the recording and reproducing apparatus according to the present invention;

FIG. 12 is a systematic block diagram showing a fourth embodiment of a recording system in the recording and reproducing apparatus according to the present invention;

FIGS. 13(A) through 13(G) show signal waveforms for explaining the operation of the block system shown in FIG. 12.

DETAILED DESCRIPTION

Figure 1:
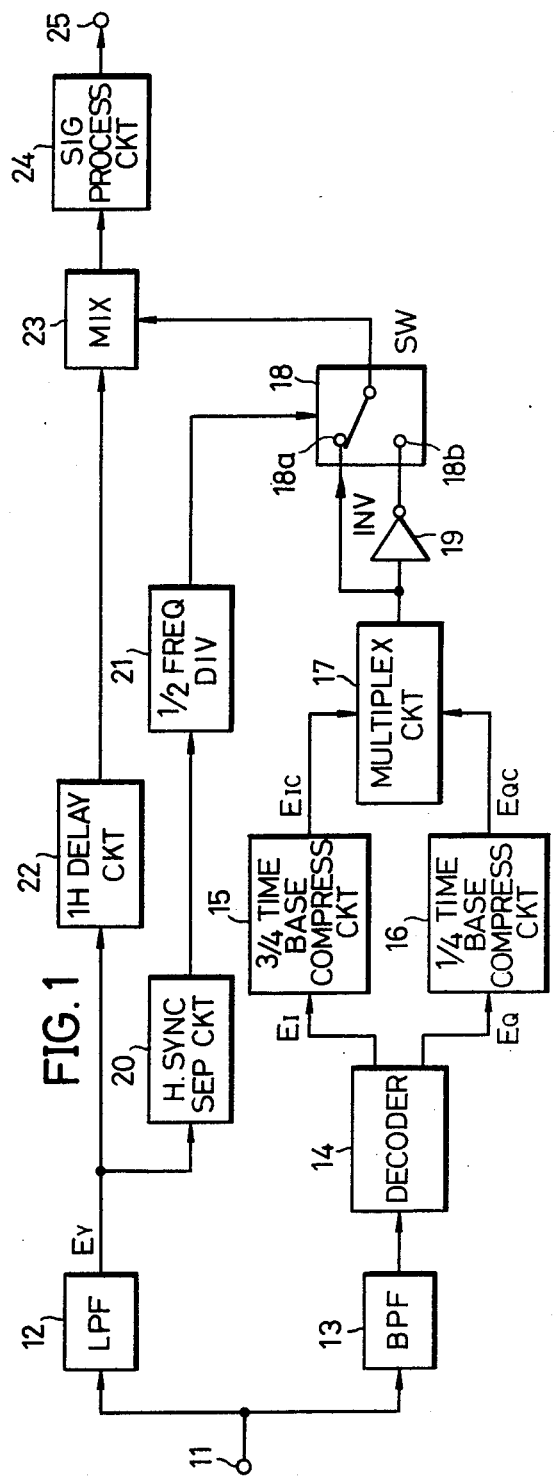
FIG. 1 is a systematic block diagram showing a first embodiment of a recording system in a recording and reproducing apparatus according to the present invention.

First, description will be given respect to a recording system in the recording and reproducing apparatus according to the present invention. FIG. 1 is a systematic block diagram showing a first embodiment of a recording system in the recording and reproducing apparatus according to the present invention. In FIG. 1, an NTSC system color video signal applied to an input terminal 11, is supplied to a lowpass filter 12 and to a bandpass filter 13. The lowpass filter 12 separates a luminance signal from the color video signal, and the bandpass filter 13 separates a carrier chrominance signal from the color video signal. For convenience' sake, it will be assumed that the color video signal is a color bar signal shown in FIG. 2(A). In this case, a luminance signal $E_Y$ shown in FIG. 2(B) is obtained from the lowpass filter 12. In FIG. 2(A), color burst signals are represented by $CB_1$, $CB_2$, and $CB_3$.

The carrier chrominance signal obtained from the bandpass filter 13, is a modulated signal which is obtained by subjecting a chrominance subcarrier having a frequency of 3.579545 MHz to a carrier suppression type quadrature modulation by two kinds of color difference signals I and Q. The carrier chrominance signal is supplied to a decoder 14 wherein the carrier chrominance signal is demodulated into an I-signal $E_I$ and a Q-signal $E_Q$. The luminance signal $E_Y$ and the color difference signals $E_I$ and $E_Q$ can be described by the following known equations, where $E_R$, $E_G$, and $E_B$ respectively represent primary color signals of red, green, and blue which are subjected to a gamma correction.

$$E_Y = 0.299 E_R + 0.587 E_G + 0.144 E_B$$

$$E_I = -0.27(E_B - E_Y) + 0.74(E_R - E_Y)$$

$$E_Q = 0.41(E_B - E_Y) + 0.48(E_R - E_Y)$$

The color difference signal $E_I$ is a base band signal occupying a band of approximately 1.5 MHz. When the color bar signal shown in FIG. 2(A) is applied to the input terminal 11, the color difference signal $E_I$ assumes a signal waveform shown in FIG. 2(C). This color difference signal $E_I$ is supplied to a ¾ time base compressing circuit 15 wherein the time base is compressed by ¾. On the other hand, the color difference signal $E_Q$ is a base band signal occupying a band of approximately 0.5 MHz. When the color bar signal shown in FIG. 2(A) is applied to the input terminal 11, the color difference signal $E_Q$ assumes a signal waveform shown in FIG. 2(D). The color difference signal $E_Q$ is supplied to a ¼ time base compressing circuit 16 wherein the time base is compressed by ¼. In FIG. 2(C), $c_1$ and $c_2$ represent burst levels which are D.C. levels acting as the color reference of the color difference signal $E_I$. Further, in FIG. 2(D), $d_1$ and $d_2$ represent burst levels of the color difference signal $E_Q$. When it is assumed that 100% white is represented by a level "1", the burst levels $c_1$ and $c_2$ are approximately equal to "0.11", and the burst levels $d_1$ and $d_2$ are approximately equal to "−0.17". The compressing circuits 15 and 16 may each be constituted by charge transfer elements such as charge coupled devices (CCDs), or by a digital circuit comprising an analog-to-digital (A/D) converter, a random access memory (RAM), and a digital-to-analog (D/A) converter.

A first time base compressed color difference signal $E_{IC}$ obtained from the compressing circuit 15, has a band of 2.0 MHz (=1.5 MHz÷(¾)), and is supplied to a multiplexing circuit 17. On the other hand, a second time base compressed color difference signal $E_{QC}$ obtained from the compressing circuit 16, has a band of 2.0 MHz (=0.5 MHz÷(¼)), and is supplied to the multiplexing circuit 17. Thus, a time division multiplexed signal having a band of 2.0 MHz and in which the first and second compressed color difference signals $E_{IC}$ and $E_{QC}$ are alternately multiplexed in time division, is obtained from the multiplexing circuit 17. The compression rate with respect to the color difference signal $E_I$ is equal to ¾, and the compression rate with respect to the color difference signal $E_Q$ is equal to ¼, and the sum of these two compression rates is equal to 1. Further, as described before, in the time division multiplexed signal, signal parts corresponding to respective time periods of 1H of the compressed color difference signals $E_{IC}$ and $E_{QC}$ are alternately multiplexed in time division, where H represents one horizontal scanning period. Thus, in a time period of 1H of the time division multiplexed signal, the signal parts corresponding to the respective time periods of 1H of the compressed color difference signal $E_{IC}$ and $E_{QC}$ are satisfactorily transmitted as shown in FIG. 2(E).

In addition, the compressed color difference signals $E_{IC}$ and $E_{QC}$ each have a band of 2.0 MHz, and can be transmitted with a satisfactory signal-to-noise (S/N) ratio even in a general video tape recorder (VTR) for home use having a relatively narrow recording and reproducing band. Hence, the frequency characteristics of the color difference signals is not deteriorated by the narrow recording and reproducing band.

The time division multiplexed signal shown in FIG. 2(E), which is obtained from the multiplexing circuit 17, is supplied to a terminal 18a of a switching circuit 18. The time division multiplexed signal is also supplied to a terminal 18b of the switching circuit 18, through an inverter 19.

On the other hand, the luminance signal $E_Y$ is supplied to a horizontal synchronizingsignal separating circuit 20. A horizontal synchronizing signal which is separated in the separating circuit 20, is supplied to a ½ frequency divider 21. The frequency divider 21 produces a symmetrical square wave which is in phase with the horizontal synchronizing signal and has a period of 2H. The output square wave of the frequency divider 21 is applied to the switching circuit 18 as a switching signal, so as to alternately switch the switching circuit 18 between the terminals 18a and 18b for every 1H. During one time period of 1H, the switching circuit 18 selectively passes a signal applied to the terminal 18a, and during a subsequent time period of 1H. the switching circuit 18 selectively passes a signal applied to the terminal 18b.

Accordingly, an output time division multiplexed signal of the switching circuit 18 has a signal waveform shown in FIG. 2(F). The time division multiplexed signal shown in FIG. 2(F) is obtained by alternately inverting the phase of the time division multiplexed signal shown in FIG. 2(E) for every 1H. The time division multiplexed signal shown in FIG. 2(F) alternately has a time period of 1H in which the compressed color difference signals $\overline{E_{IC}}$ and $\overline{E_{QC}}$ are multiplexed in time division, and a time period of 1H in which phase inverted signals $E_{IC}$ and $E_{QC}$ of the compressed color difference signals $E_{IC}$ and $E_{QC}$ are multiplexed in time division. The output time division multiplexed signal shown in FIG. 2(F) of the switching circuit 18, is supplied to a mixing circuit 23. The mixing circuit 23 is also supplied with the output non-compressed luminance signal $E_Y$ shown in FIG. 2(B) of the lowpass filter 12, through a 1H delay circuit 22. The mixing circuit 23 produces a multiplexed signal (multiplexed color video signal) shown in FIG. 2(G), and supplies this multiplexed color video signal to a recording signal processing circuit 24 as a recording signal. At least a delay of 1H is introduced in the compressing circuits 15 and 16, and the 1H delay circuit 22 is provided so as to compensate for the delay in the compressing circuits 15 and 16.

Figure 3:
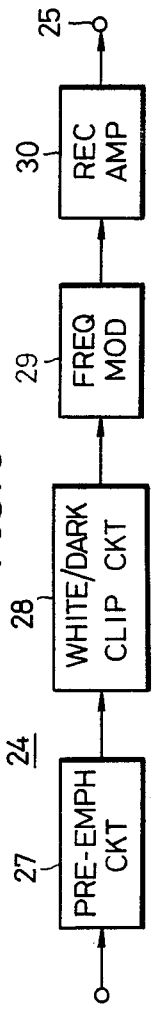
FIG. 3 is a systematic block diagram showing an example of general recording signal processing circuit within the block system shown in FIG. 1.

The processing circuit 24 performs a signal processing suited for the magnetic recording and reproduction, with respect to the output multiplexed color video signal of the mixing circuit 23. The construction of the processing circuit 24 is known in the VTR. For example, the processing circuit 24 may comprise a pre-emphasis circuit 27, a white/dark clipping circuit 28, a frequency modulator 29, and a recording amplifier 30, as shown in FIG. 3. A frequency modulated signal which is obtained by frequency-modulating a carrier by the multiplexed color video signal shown in FIG. 2(G), for example, is obtained from the processing circuit 24 and is produced through an output terminal 25. The frequency modulated signal produced through the output terminal 25 is supplied to rotary heads (not shown) and is recorded on a magnetic tape (not shown).

Figures 4, 5:
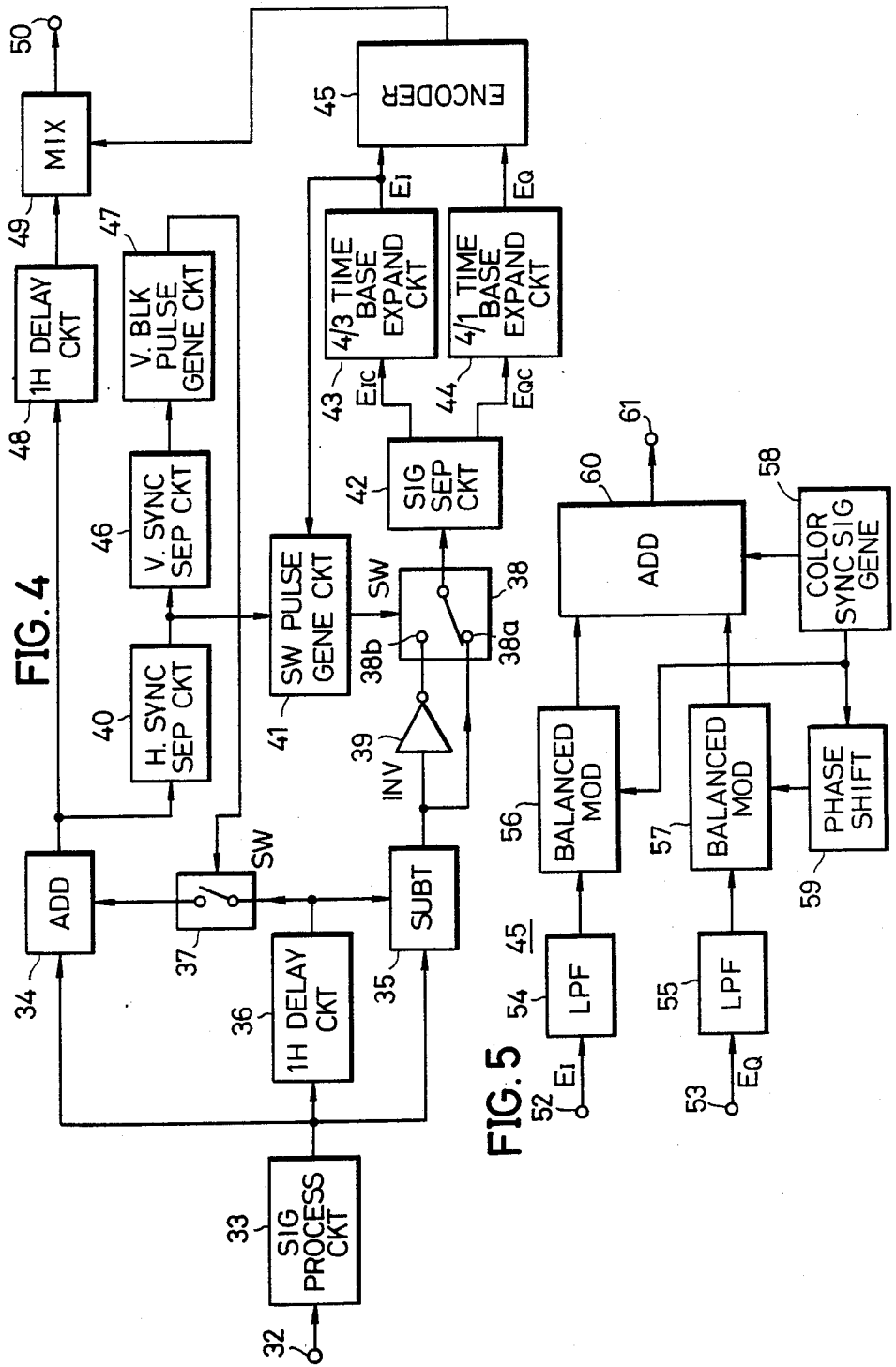
FIG. 4 is a systematic block diagram showing a first embodiment of a reproducing system in the recording and reproducing apparatus according to the present invention.
FIG. 5 is a systematic block diagram showing a general encoder within the block system shown in FIG. 4.

Next, description will be given with respect to a reproducing system in the recording and reproducing apparatus according to the present invention. FIG. 4 is a systematic block diagram showing a first embodiment of a reproducing system in the recording and reproducing apparatus according to the present invention. In FIG. 4, a frequency modulated signal which is reproduced from a magnetic tape (not shown) by rotary heads (not shown), is applied to an input terminal 32. The reproduced frequency modulated signal is supplied to a reproduced signal processing circuit 33 wherein a frequency demodulation and a de-emphasis are performed so as to obtain a reproduced multiplexed color video signal shown in FIG. 2(G). The reproduced multiplexed color video signal is supplied to an adding circuit 34, a subtracting circuit 35, and to a 1H delay circuit 36. The reproduced multiplexed color video signal which is delayed by 1H in the 1H delay circuit 36, is supplied to the subtracting circuit 35, and is also passed through a switching circuit 37 and supplied to the adding circuit 34. The circuits 34, 35, 36, and 37 constitute a comb filter circuit which is made up of first and second comb filters. The first comb filter is constituted by the circuits 34, 36, and 37, and the second comb filter is constituted by the circuits 35 and 36. A luminance signal within the reproduced multiplexed color video signal is obtained from the adding circuit 34 of the first comb filter. The time division multiplexed signal having a phase which is inverted for every 1H as shown in FIG. 2(F), is obtained from the subtracting circuit 35 of the second comb filter.

A more detailed description on the above will be given hereinafter. It will be assumed that there are two signals A and B, and that the signal B is transmitted in a sequence B, $\overline{B}$, B, $\overline{B}$, B, ... by inverting the phase for every 1H. When the signal A is added to the signal B which is transmitted in the above sequence, a signal A+B is transmitted in the n-th line (horizontal scanning line), a signal A+$\overline{B}$ is transmitted in the (n+1)-th line, a signal A+B is transmitted in the (n+2)-th line, a signal A+B̄ is transmitted in the (n+3)-th line, ..., where n is an integer. When such an added signal is passed through a 1H delay circuit, the signal A+B is obtained in the (n+1)-th line, the signal A+B̄ is obtained in the (n+2)-th line, the signal A+B is obtained in the (n+3)-th line, .... Accordingly, from a first comb filter which comprises the 1H delay circuit and an adding circuit for adding input and output signal of the 1H delay circuit, a signal 2A is obtained in all of the lines. On the other hand, from a second comb filter which comprises the 1H delay circuit and a subtracting circuit for subtracting the output signal of the 1H delay circuit from the input signal of the 1H delay circuit, a signal 2B̄ is obtained in the (n+1)-th line, a signal 2B is obtained in the (n+2)-th line, a signal 2B̄ is obtained in the (n+3)-th line, ..., that is, the phase of the signal 2B is inverted for every 1H.

In the present embodiment, the signal A is the luminance signal $E_Y$, and the signal B is the time division multiplexed signal shown in FIG. 2(E) which is made up of the compressed color difference signals $E_{IC}$ and $E_{QC}$. Thus, the luminance signal $E_Y$ is obtained from the circuit 34, and the time division multiplexed signal of the compressed solor difference signals $E_{IC}$ and $E_{QC}$ is obtained from the subtracting circuit 35 with the phase inverted for every 1H. In other words, the time division multiplexed signal shown in FIG. 2(F) is obtained from the subtracting circuit 35. The output time division multiplexed signal of the subtracting circuit 35 is supplied to a terminal 38a of a switching circuit 38. The output time division multiplexed signal of the subtracting circuit 35 is also supplied to a terminal 38b of the switching circuit 38, through an inverter 39.

On the other hand, an output reproduced luminance signal of the adding circuit 34 is supplied to a horizontal synchronizing signal separating circuit 40 wherein the horizontal synchronizing signal is separated. The output horizontal synchronizing signal of the separating circuit 40, is supplied to a switching pulse generating circuit 41. The switching pulse generating circuit 41 is suppied with the reproduced horizontal synchronizing signal from the separating circuit 40 and a reproduced color difference signal $E_I$ from a 4/3 time base expanding circuit 43 which will be described later on in the specification. The switching pulse generating circuit 41 detects the burst level of the reproduced color difference signal $E_I$, and generates a symmetrical square wave which has a polarity such that the detected burst level assumes the correct value (that is, a value approximately equal to "0.11" when 100% white is represented by "1" as described before), in phase with the reproduced horizontal synchronizing signal, and with a period of 2H. The output square wave of the switching pulse generating circuit 41 is applied to the switching circuit 38 as a switching pulse signal. As a result, the switching circuit 38 is alternately connected to the terminals 38a and 38b for every 1H. The switching circuit 38 produces a reproduced time division multiplexed signal in which the phase inversion is eliminated as shown in FIG. 2(E), and supplies the reproduced time division multiplexed signal to a signal separating circuit 42 located in a subsequent stage.

The signal separating circuit 42 supplies to the 4/3 time base expanding circuit 43 the compressed color difference signal $E_{IC}$ which is transmitted within a time period of 3H/4 from the start of each 1H, and supplies to a 4/1 time base expanding circuit 44 the compressed color difference signal $E_{QC}$ which is transmitted within a remaining time period of 1H/4 of each 1H. The expanding circuit 43 expands the time base of the compressed color difference signal $E_{IC}$ so as to generate a reproduced color difference signal $E_I$ in which the time base is returned to the original time base. This reproduced color difference signal $E_I$ is supplied to the switching pulse generating circuit 41 and to an encoder 45. On the other hand, the expanding circuit 44 expands the time base of the compressed color difference signal $E_{QC}$ so as to generate a reproduced color difference signal $E_Q$ in which the time base is returned to the original time base. This reproduced color difference signal $E_Q$ is supplied to the encoder 45. The encoder 45 forms a carrier chrominance signal which is in conformance with the NTSC system, for example, from the reproduced color difference signals $E_I$ and $E_Q$ which are supplied thereto. The carrier chrominance signal is supplied to a mixing circuit 49.

FIG. 5 shows a general construction of the encoder 45. In FIG. 5, the reproduced color difference signals $E_I$ and $E_Q$ are applied to respective terminals 52 and 53, and are supplied to respective lowpass filters 54 and 55. Output signals of the lowpass filters 54 and 55 are supplied to respective balanced modulators 56 and 57. A carrier having a frequency of 3.58 MHz which is obtained from a color synchronizing signal generator 58, is supplied to the balanced modulator 56. This carrier is also phase-shifted by $-90°$ in a phase shifter 59, and is then supplied to the balanced modulator 57. Modulated signals which are obtained by subjecting the carrier to a balanced modulation by the respective color difference signal $E_I$ and $E_Q$, are obtained from the balanced modulators 56 and 57. The output modulated signals of the balanced modulators 56 and 57 are supplied to an adding circuit 60 and is added with a color burst signal obtained from the color synchronizing signal generator 58. As a result, a carrier chrominance signal which is in conformance with the NTSC system, is produced through an output terminal 61.

The switching circuit 37 selectively passes the output signal of the 1H delay circuit 36, responsive to a switching pulse signal. This switching pulse signal is a vertical blanking pulse signal having a predetermined level during a time period corresponding to the vertical blanking period, and is obtained by passing the reproduced horizontal synchronizing signal through a vertical synchronizing signal separating circuit 46 and a vertical blanking pulse generating circuit 47. Hence, the switching circuit 37 is turned OFF during the vertical blanking period, and blocks the transmission of the output signal of the 1H delay circuit 36 to the adding circuit 34. The switching circuit 37 is turned ON during time periods other than the vertical blanking period, and permits the transmission of the output signal of the 1H delay circuit 36 to the adding circuit 34.

As is well known, the phase of the vertical synchronizing signal differs by H/2 between the odd and even fields due to the interlaced scanning. The switching circuit 37 is provided so as to prevent the vertical synchronizing signal of the reproduced luminance signal $E_Y$ which is obtained from the adding circuit 34 from becoming distorted due to the phase difference of H/2 in the vertical synchronizing signal, by use of the first comb filter. Accordingly, the first comb filter which is constituted by the circuits 34, 36, and 37 and is provided with respect to the luminance signal, is inoperative during the vertical blanking period. During this time period in which the first comb filter is inoperative, the output reproduced multiplexed color video signal of the processing circuit 33 is obtained unchanged from the adding circuit 34. The color difference signals do not exist in the vertical blanking period of the reproduced multiplexed color video signal (although the burst level exists subsequent to the equalizing pulse after the vertical synchronizing signal).

The reproduced luminance signal which is obtained from the adding circuit 34, is delayed by 1H in a 1H delay circuit 48, and is then supplied to the mixing circuit 49. A time delay of at least 1H is generated in the expanding circuits 43 and 44, and the 1H delay circuit 48 is provided so as to match the timing of the reproduced luminance signal with the timing of the reproduced carrier chrominance signal. The mixing circuit 49 mixes the reproduced luminance signal from the 1H delay circuit 48 and the reproduced carrier chrominance signal from the encoder 45, and generates a reproduced color video signal which is in conformance with the NTSC system. This reproduced color video signal is produced through an output terminal 50.

Hence, according to the present embodiment, the I-signal $E_I$ can be recorded and reproduced without being band-limited. Further, the color video signal can be recorded and reproduced satisfactorily in the form of a multiplexed signal of the time division multiplexed signal and the luminance signal, even in the VTR for home use having the relatively narrow recording and reproducing band.

Next, description will be given with respect to a second embodiment of a recording system in the recording and reproducing apparatus according to the present invention, which is applied to a SECAM system standard helical scan type VTR, by referring to FIG. 6. In FIG. 6, a SECAM system color video signal applied to an input terminal 62, is supplied to a lowpass filter 63 and to a bandpass filter 64. A luminance signal is separated in the lowpass filter 63, and a carrier chrominance signal is separated in the bandpass filter 64. As is well known, the SECAM system carrier chrominance signal is a line-sequential signal in which the a first frequency modulated color difference signal and a second frequency modulated color difference signal alternately exist for every 1H in time sequence. The first frequency modulated color difference signal is obtained by frequency-modulating a first carrier having a frequency of 4.40625 MHz by a color difference signal $D_R$ which is described by the following equation, and the second frequency modulated color difference signal is obtained by frequency-modulating a second carrier having a frequency of 4.425 MHz by a color difference signal $D_B$ which is described by the following equation, where $E_R$ and $E_B$ represent primary color signals of red and blue which are subjected to a gamma correction, and $E_Y$ is the luminance signal which is described by the same generating equation as the NTSC system luminance signal.

$$D_R = -1.9(E_R - E_Y)$$

$$D_B = 1.5(E_B - E_Y)$$

The carrier chrominance signal is supplied to a frequency demodulator 65 wherein the carrier chrominance signal is demodulated into a line-sequential color difference signal made up of the color difference signals $D_R$ and $D_B$. The line-sequential color difference signal is applied to terminals 66a and 66c of a switching circuit 66. Further, the line-sequential color difference signal is also applied to a terminal 66b of the switching circuit 66, through a 1H delay circuit 67. The switching of the switching circuit 66 is controlled responsive to a symmetrical square wave which is obtained by passing the output luminance signal of the lowpass filter 63 through a horizontal synchronizing signal separating circuit 73 and a ½ frequency divider 74. The symmetrical square wave has a period of 2H. As a result, the switching circuit 66 alternately produces the input signals to the terminals 66a and 66b through a terminal 66d for every 1H, and alternately produces the input signals to the terminals 66b and 66c through a terminal 66e for every 1H. Hence, the color difference signal $D_R$ related to the same time period of 1H is repeatedly obtained from the terminal 66d during a time period of 2H, and is supplied to a ½ time base compressing circuit 68. On the other hand, the color difference signal $D_B$ related to the same time period of 1H is repeatedly obtained from the terminal 66e during a time period of 2H, and is supplied to a ½ time base compressing circuit 69.

The color difference signals $D_R$ and $D_B$ are base band signals occupying the same band (approximately 1.3 MHz). Hence, when the color difference signals $D_R$ and $D_B$ are time base compressed by ½ in the respective compressing circuits 68 and 69, the band of the color difference signals $D_R$ and $D_B$ becomes equal to 2.6 MHz (=1.3 MHz÷(½)). Output time base compressed color difference signals $D_{RC}$ and $D_{BC}$ of the compressing circuits 68 and 69 are supplied to a multiplexing circuit 70 wherein the compressed color difference signals $D_{RC}$ and $D_{BC}$ are converted into a time division multiplexed signal. The output time division multiplexed signal of the multiplexing circuit 70 is applied to a terminal 71a of a switching circuit 71, and is also applied to a terminal 71b of the switching circuit 71 through an inverter 72. The compression rates with respect to the color difference signals $D_R$ and $D_B$ are each equal to ½, and a sum of these two compression rates is equal to 1. Thus, as in the case of the first embodiment described before, the information contents of the compressed color difference signals $D_{RC}$ and $D_{BC}$ in the respective time periods of 1H, can be transmitted satisfactorily within the time period of 1H of the time division multiplexed signal. The time division multiplexed signal has a band which is approximately equal to 2.6 MHz, and can be recorded and reproduced with a satisfactorily S/N ratio even by the VTR for home use.

The switching circuit 71 is controlled responsive to the symmetrical square wave which has the period of 2H and is obtained from the ½ frequency divider 74, so as to alternately pass the input signals of the terminals 71a and 71b for every 1H. Thus, a time division multiplexed signal in which the phase is inverted for every 1H, is obtained from the switching circuit 71 and is supplied to a mixing circuit 75.

On the other hand, the output luminance signal $E_Y$ of the lowpass filter 63 is passed through a 1H delay circuit 76 and is supplied to the mixing circuit 75. The mixing circuit 75 produces a multiplexed color video signal made up of the non-compressed luminance signal and the time division multiplexed signal in which the phase is inverted for every 1H, and supplies the multiplexed color video signal to a recording signal processing circuit 77. The processing circuit 77 itself is known, and converts the format of the multiplexed color video signal into a signal format suited for the magnetic recording and reproduction. An output multiplexed color video signal of the processing circuit 77 is produced through an output terminal 78.

Next, description will be given with respect to a second embodiment of a recording system in the recording and reproducing apparatus according to the present invention, which is applied to the SECAM system standard helical scan type VTR, by referring to FIG. 7. In FIG. 7, those parts which are the same as those corresponding parts in FIG. 4 are designated by the same reference numerals, and their description will be omitted. In FIG. 7, a reproduced signal applied to an input terminal 80, is supplied to a reproduced signal processing circuit 81 wherein the reproduced signal is converted into a reproduced multiplexed color video signal having the same signal format as the output multiplexed color video signal of the mixing circuit 75 shown in FIG. 6. The reproduced multiplexed color video signal is supplied to the adding circuit 34, the subtracting circuit 35, and to the 1H delay circuit 36.

A reproduced time division multiplexed signal in which the phase is inverted for every 1H, is obtained from the subtracting circuit 35 and is supplied to a switching circuit 82. The switching circuit 82 is controlled responsive to an output switching pulse signal of a switching pulse generating circuit 84. This switching pulse signal is a symmetrical square wave which has a period of 2H, and is formed from the output reproduced horizontal synchronizing signal of the horizontal synchronizing signal separating circuit 40, and a burst level detection signal with respect to an output reproduced color difference signal of a 2/1 time base expanding circuit 83 which will be described later on in the specification. Hence, only a positive polarity signal part of the reproduced time division multiplexed signal, is intermittently produced from the switching circuit 82 with an interval of 1H. The positive polarity signal part of the reproduced time division multiplexed signal, which is intermittently produced from the switching circuit 82, is supplied to the expanding circuit 83 wherein the time base is expanded by 2 and is returned to the original time base. Hence, a line-sequential color difference signal in which the color difference signals $D_R$ and $D_B$ are alternately multiplexed in time sequence for every 1H, is obtained from the expanding circuit 83 with the original time base. The output line-sequential color difference signal of the expanding circuit 83 is supplied to a frequency modulator 85, and is frequency-modulated into a carrier chrominance signal which is in conformance with the SECAM system.

The output carrier chrominance signal of the frequency modulator 85 is supplied to a mixing circuit 86, and is mixed with the output reproduced luminance signal of the 1H delay circuit 48. Thus, a reproduced color video signal which is in conformance with the SECAM system is produced through an output terminal 87.

In the first and second embodiments of the recording system, the two kinds of time base compressed color difference signals are time-division-multiplexed, and the process of inverting the phase for every 1H is performed thereafter. However, although the circuit construction will become slightly complicated, the process of inverting the phase for every 1H may be performed with respect to the two kinds of time base compressed color difference signals, and the time-division-multiplexing may be performed thereafter. In addition, a circuit part between the output of the subtracting circuit 35 and the input of the encoder 45 in the first embodiment of the reproducing system shown in FIG. 4, and a circuit part between the output of the frequency demodulator 65 and the mixing circuit 75 in the second embodiment of the recording system shown in FIG. 6, may be modified. Further, in the second embodiment of the reproducing system shown in FIG. 7, the connection positions of the circuits 82 and 83 may be interchanged. Moreover, the switching pulse generating circuit 41 shown in FIG. 4 may be designed to detect the burst level of the reproduced color difference signal $E_Q$ from the expanding circuit 44, and set the polarity of the switching pulse signal based on the detected result.

The present embodiment may be applied to the PAL system color video signal. In this case, the carrier chrominance signal is a modulated signal which is obtained by subjecting a predetermined carrier to a carrier suppression type quadrature modulation by a first color difference signal described by $0.493(E_B=E_Y)$ and by a second color difference signal $E_V$ described by $0.877(E_R-E_Y)$. As is well known, the phase of the carrier of the color difference signal $E_V$ is inverted for every 1H. The bands of the color difference signals $E_U$ and $E_V$ are the same, and are approximately equal to 1.3 MHz. Thus, as in the case of the SECAM system color video signal, the color difference signals $E_U$ and $E_V$ are time base compressed by ½ at the time of the recording and are time base expanded by 2/1 at the time of the reproduction. The color difference signals have bands which are approximately equal to 2.6 MHz after being subjected to the time base compression, and can be recorded and reproduced satisfactorily by the VTR for home use.

In the embodiments described heretofore, the time base compression rates are selected as follows. That is, between a first color difference signal $E_1$ having a band $BW_1$ and a second color difference signal $E_2$ having a band $BW_2$, the first color difference signal $E_1$ is time base compressed with a compression rate of $BW_1/(BW_1+BW_2)$, and the second color difference signal $E_2$ is time base compressed with a compression rate of $BW_2/(BW_1+BW_2)$. For this reason, the bands of the time base compressed first and second color difference signals become equal to $(BW_1+BW_2)$, and the first and second color difference signals can be recorded and reproduced satisfactorily in the VTR without being band-limited. Moreover, a sum of the two compression rates $BW_1/(BW_1+BW_2)$ and $BW_2/(BW_1+BW_2)$ is equal to 1, which means that the compressed first and second color difference signals in the respective time periods of 1H can be transmitted satisfactorily within the time period of 1H of the time division multiplexed signal.

Next, description will be given with respect to a third embodiment of the recording and reproducing apparatus according to the present invention. FIG. 8 shows a third embodiment of a recording system in the recording and reproducing apparatus according to the present invention. In FIG. 8, those parts which are the same as those corresponding parts in FIG. 1 are designated by the same reference numerals, and their description will be omitted.

The color video signal can be divided roughly into a color video signal having a large correlation (line correlation, or vertical correlation) in the video information with respect to the vertical direction of the picture, and a color video signal having a small vertical correlation. As will be described later on in the specification, the present embodiment takes into consideration the color video signal having the small vertical correlation, so as to minimize the deterioration in the picture quality of the reproduced picture. In the present embodiment, the signal parts of the color difference signal $E_Q$ (Q-signal) having the narrower band, are time base compressed by 1/5, at least within the effective horizontal scanning period and the burst level transmission period. In other words, when an NTSC color video signal shown in FIG. 9(A) is applied to the input terminal 11 shown in FIG. 8, the color difference signals $E_I$ and $E_Q$ respectively shown in FIGS. 9(C) and 9(D), are produced from the encoder 14. Between these color difference signals $E_I$ and $E_Q$, the color difference signal $E_Q$ is supplied to a 1/5 time base compressing circuit 91. The compressing circuit 91 compresses the time base of the signal parts of the color difference signal $E_Q$ shown in FIG. 9(D), within a time period $T_1$ and within a time period $T_2$ which includes the burst level transmission period and the vicinity of the burst level transmission period. The time period $T_1$ is a time period excluding the horizontal blanking period of 10.5 μsec to 11.4 μsec of 1H (=63.5555 μsec), and is equal to the effective scanning period of 53.0555 μsec to 52.1555 μsec.

The compressing circuit 91 can be constituted by charge transfer elements such as the CCDs, or by a digital circuit comprising an A/D converter, a RAM, and a D/A converter.

A time base compressed color difference signal $E_{QC}$ in which the signal parts are time base compressed by 1/5 within the effective horizontal scanning period $T_1$ and within the time period $T_2$ including the burst level transmission period, is obtained from the compressing circuit 91 and is supplied to a multiplexing circuit 92. The multiplexing circuit 92 time-division-multiplexes the compressed color difference signal $E_{QC}$ within the horizontal blanking period of the other color difference signal $E_I$ which is obtained from the decoder 14 and is passed through a burst eliminating circuit 90. When the burst levels $c_1$ and $c_2$ exist in the horizontal blanking period of the color difference signal $E_I$ shown in FIG. 9(C), the compressed color difference signal $E_{QC}$ cannot be separated in a reproducing system which will be described later on in the specification after the color difference signal $E_I$ and the compressed color difference signal $E_{QC}$ are time-division-multiplexed. Hence, the burst eliminating circuit 90 is provided so as to eliminate the burst levels $c_1$ and $c_2$ beforehand.

The levels of the color difference signals $E_I$ and $E_Q$ within a time period excluding the time periods $T_1$ and $T_2$, are constant. Moreover, the signal parts in the time period excluding the time period $T_1+T_2$ of the color difference signal $E_Q$, are not produced from the compressing circuit 91. As a result, a time division multiplexed signal shown in FIG. 9(E) is produced from the multiplexing circuit 92. In a time period of 1H of this time division multiplexed signal, the color difference signal $E_I$ within the effective horizontal scanning period and the compressed color difference signal $E_{QC}$ are multiplexed in time division. The compressed color difference signal $E_{QC}$ is a signal in which the time base of the color difference signal $E_Q$ having the band of approximately 0.5 MHz is compressed by 1/5, and thus, the band of the compressed color difference signal $E_{QC}$ is approximately equal to 2.5 MHz ($=0.5$ MHz$\div (1/5)$). Accordingly, the band of the output time division multiplexed signal of the multiplexing circuit 92 is approximately equal to 2.5 MHz, and such a time division multiplexed signal can be recorded and reproduced with a satisfactory S/N ratio in the VTR for home use having the relatively narrow recording and reproducing band. Hence, the frequency characteristics of the color difference signals will not be deteriorated by the relatively narrow recording and reproducing band. In addition, the color difference signal $E_I$ within the time division multiplexed signal is not band-limited, and can be recorded and reproduced with the original band of approximately 1.5 MHz.

The output time division multiplexed signal of the multiplexing circuit 92 shown in FIG. 9(E), is supplied to the terminal 18a of the switching circuit 18, and is also supplied to the terminal 18b of the switching circuit 18 through the inverter 19.

The output signal of the switching circuit 18 is a time division multiplexed signal which is obtained by inverting the phase of the time division multiplexed signal shown in FIG. 9(E) for every 1H, as shown in FIG. 9(F). In other words, a time period of 1H in which the color difference signal $E_I$ and the compressed color difference signal $E_{QC}$ are multiplexed in time division, and a time period of 1H in which the phase inverted signals $\overline{E_I}$ and $\overline{E_{QC}}$ of the color difference signals $E_I$ and the compressed color difference signal $E_{QC}$ are multiplexed in time division, alternately exist in the time division multiplexed signal shown in FIG. 9(F). The output time division multiplexed signal of the switching circuit 18 shown in FIG. 9(F), is supplied to the mixing circuit 23 and is mixed with the non-compressed luminance signal $E_Y$ shown in FIG. 9(B) which is obtained from the lowpass filter 12 through the 1H delay circuit 22. The mixing circuit 23 produces a multiplexed color video signal shown in FIG. 9(G), and supplies this multiplexed color video signal to the processing circuit 24. A frequency modulated signal which is obtained by frequency-modulating a carrier by the multiplexed color video signal shown in FIG. 9(G), is produced from the processing circuit 24 and is supplied to rotary heads (not shown) through an output terminal 93 so as to record the frequency modulated signal on a magnetic tape (not shown).

Next, description will be given with respect to a third embodiment of a reproducing system in the recording and reproducing apparatus according to the present invention, by referring to FIG. 10. In FIG. 10, those parts which are the same as those corresponding parts in FIG. 4 are designated by the same reference numerals, and their description will be omitted. In FIG. 10, a frequency modulated signal which is the same as the frequency modulated signal obtained through the output terminal 93 shown in FIG. 8, is reproduced from a magnetic tape (not shown) by rotary heads (not shown) and is supplied to the processing circuit 33 through an input terminal 95. The processing circuit 33 produces a reproduced multiplexed color video signal shown in FIG. 9(G), and supplies this reproduced multiplexed color video signal to the comb filter circuit. As described before, the comb filter circuit constituted by the first comb filter which is provided with respect to the luminance signal and comprises the adding circuit 34, the 1H delay circuit 36, and the switching circuit 37, and the second comb filter which is provided with respect to the time division multiplexed signal and comprises the subtracting circuit 35 and the 1H delay circuit 36.

According to the principle described before, the luminance signal $E_Y$ is obtained from the adding circuit 34, and the time division multiplexed signal is obtained from the subtracting circuit 35 with the phase inverted for every 1H (that is, with the signal waveform shown in FIG. 9(F)).

However, the description given before applies to an ideal case where a perfect vertical correlation exists between the luminance signal $E_Y$ and the time division multiplexed signal. In reality, a perfect vertical correlation does not exist between the luminance signal $E_Y$ and the time division multiplexed signal. In other words, in reality, the time division multiplexed signal, that is, the vertical direction differentiated component of the color difference signal (for example, a signal which is a sum of the time division multiplexed signal in the n-th line and the phase inverted signal of the time division multiplexed signal in the (n−1)-th line, or a signal which is a sum of the phase inverted signal of the time division multiplexed signal in the (n+1)-th line and the time division multiplexed signal in the n-th line), mixes into the luminance signal. Further, the vertical direction differentiated component of the luminance signal $E_Y$ (for example, a signal which is a difference between the luminance signals in the n-th and (n−1)-th lines, or a signal which is a difference between the luminance signals in the (n+1)-th and n-th lines) mixes into the color difference signals (time division multiplexed signal).

In addition, unlike in the present embodiment, two kinds of compressed color difference signals may be time-division-multiplexed within a time period of 1H of a time division multiplexed signal, and the time division multiplexed signal may be multiplexed with a luminance signal and recorded on a recording medium with the phase of the time division multiplexed signal inverted for every 1H. However, when recorded signals are reproduced from such a recording medium, no correlation exists between the luminance signal and the compressed color difference signals within the time division multiplexed signal. Consequently, the effect of the vertical direction differentiated component of the luminance signal or the color difference signals, which mixes into the color difference signals or the luminance signal, may become conspicuous in the reproduced picture.

Figure 11A:
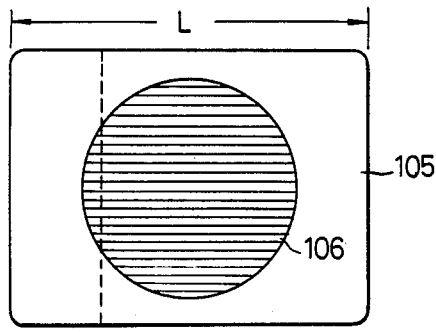
FIGS. 11A through 11D are diagrams for explaining reproduced pictures which are obtained when a luminance signal is recorded and reproduced together with a time division multiplexed signal which is made up of two kinds of time base compressed color difference signals and has a phase which is inverted for every one horizontal scanning period.
Figure 11B:
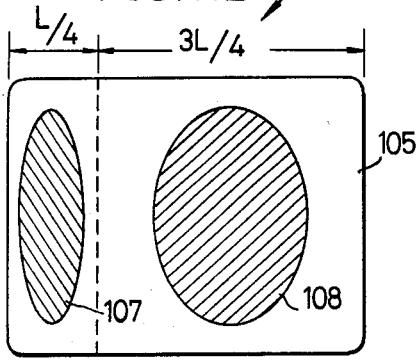

For example, the recording may be performed in the following manner. That is, between the color difference signals $E_I$ and $E_Q$ constituting a color video signal which contains information for displaying a circular color picture 106 on a screen 105 which has a horizontal width L shown in FIG. 11A, the color difference signal $E_I$ may be time base compressed by $\frac{3}{4}$ and the color difference signal $E_Q$ may be time base compressed by $\frac{1}{4}$. The two compressed color difference signals may be time-division-multiplexed within a time period of 1H, and the time division multiplexed signal may be recorded on a recording medium. When the recorded signal is reproduced from such a recording medium without subjecting the reproduced signal to a time base expansion, a color picture 107 of the color difference signal $E_Q$ will be displayed in the left part of the screen 105 within a width L/4, as shown in FIG. 11B. A color picture 108 of the color difference signal $E_I$ will be displayed in the remaining part of the screen 105 within a width 3L/4, as shown in FIG. 11B.

Figure 11C:
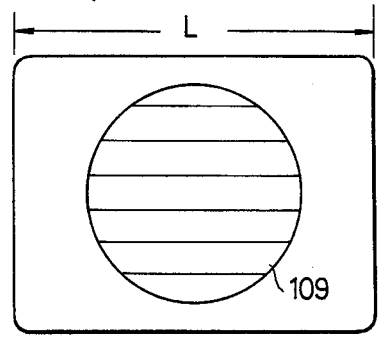
Figure 11D:
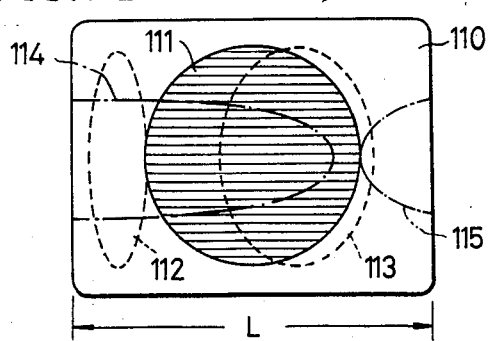

On the other hand, when the non-compressed luminance signal is multiplexed with the above time division multiplexed signal, a picture of the luminance signal becomes as indicated by a circular picture 109 shown in FIG. 11C. The picture 109 has the same shape and size as the original circular color picture, and is a black-and-white picture indicating only the luminance. The recording and reproducing apparatus may be of the type which inverts the phase of the time division multiplexed signal for every 1H and then multiplexes the time division multiplexed signal with the luminance signal upon recording. In this case, a reproduced luminance signal and a reproduced time division multiplexed signal are separated from the reproduced signal by use of a comb filter circuit, upon reproduction. The two kinds of compressed color difference signals within the reproduced time division multiplexed signal are time base expanded back into the original time base, so as to form a reproduced carrier chrominance signal from the two kinds of color difference signals. The reproduced carrier chrominance signal and the reproduced luminance signal are mixed, so as to obtain a reproduced color video signal. In this case, a picture shown in FIG. 11D is displayed on a screen 110. However, on the screen 110, lines indicated by phantom lines 112 and 113 which are caused by the mixing of the vertical direction differentiated components of the color difference signals into the luminance signal, and lines indicated by one-dot chain lines 114 and 115 which are caused by the mixing of the vertical direction differentiated components of the luminance signal into the color difference signals, are displayed in addition to a color picture 111 having the same shape and color phase as the original color picture 106.

The lines 112 and 113 correspond to the contours of the respective color pictures 107 and 108, and are displayed as rings having different luminance. The lines 114 and 115 are displayed as colored lines, and the line appears thicker at places (upper and lower parts of the picture) where there is no vertical correlation. The object of the present invention is to substantially reduce the unwanted lines 112 through 115 which are displayed on the screen 110 together with the color picture 111. The line 114 which is displayed the screen 110, corresponds to the contour of the picture part which is obtained by time base expanding the picture part displayed within a width 3L/4 in the right part of the color picture 106 by 4/3. On the other hand, the line 115 displayed on the screen 110, corresponds to the contour of the picture part which is obtained by time base expanding the picture part displayed within a width L/4 in the left part of the color picture 106 by 4.

Returning now to the description of FIG. 10, the output time division multiplexed signal of the subtracting circuit 35 is supplied to the terminal 38a of the switching circuit 38, and is also supplied to the terminal 38b of the switching circuit 38 through the inverter 39.

A switching pulse generating circuit 96 is supplied with the reproduced horizontal synchronizing signal from the horizontal synchronizing signal separating circuit 40, and with the reproduced color difference signal $E_Q$ from a 5/1 time base expanding circuit 99. The switching pulse generating circuit 96 detects the burst levels of the reproduced color difference signal $E_Q$, and generates a symmetrical square wave which changes polarity so that the burst levels in the reproduced color difference signal $E_Q$ from the expanding circuit 99 assume the correct value (that is, a value approximately equal to "−0.17" when 100% white is represented by "1" as described before). The output symmetrical square wave of the switching pulse generating circuit 96 is in phase with the reproduced horizontal synchronizing signal, and has a period of 2H. The symmetrical square wave is applied to the switching circuit 38 as a switching pulse signal. Accordingly, the switching circuit 38 is alternately switched between the terminals 38a and 38b for every 1H, and a reproduced time division multiplexed signal in which the phase inversion for every 1H is eliminated as shown in FIG. 9(E) is produced from the switching circuit 38 and is supplied to a switching circuit 97 provided in the subsequent stage.

The switching circuit 97 selectively passes the output signal of the switching circuit 38, responsive to a switching pulse signal. This switching pulse signal is a vertical blanking pulse signal having a predetermined level during a time period corresponding to the horizontal blanking period of the reproduced luminance signal, and is obtained by passing the reproduced horizontal synchronizing signal through a horizontal blanking pulse generating circuit 98. Hence, the switching circuit 97 is connected to a terminal 97a during a time period corresponding to the horizontal blanking period, and is connected to a terminal 97b during other time periods. Therefore, the switching circuit 97 produces the reproduced color difference signal $E_I$ from the terminal 97a thereof, and supplies the reproduced color difference signal $E_I$ to the encoder 45 through a 1H delay circuit 100. On the other hand, the switching circuit 97 produces the reproduced compressed color difference signal $E_{QC}$ from the terminal 97b thereof, and supplies this reproduced compressed color difference signal $E_{QC}$ to the expanding circuit 99.

The expanding circuit 99 expands the time base of the reproduced compressed color difference signal $E_{QC}$ by 5, and produces a reproduced color difference signal $E_Q$ having the original time base. The reproduced color difference signal $E_Q$ includes the burst levels, and the burst levels are detected in the switching pulse generating circuit 96. Further, the reproduced color difference signal $E_Q$ is also supplied to the encoder 45. The encoder 45 forms a reproduced carrier chrominance signal which is in conformance with the NTSC system, from the reproduced color difference signals $E_I$ and $E_Q$ supplied thereto. The output reproduced carrier chrominance signal of the encoder 45 is supplied to the mixing circuit 49. Since the burst levels of the reproduced color difference signal $E_I$ are eliminated at the time of the recording, the color burst signal is generated by an oscillator or the like within the encoder 45. The 1H delay circuit 100 is provided so as to match the timing of the reproduced color difference signal $E_I$ with the timing of the reproduced color difference signal $E_Q$ which is obtained from the expanding circuit 99.

According to the present embodiment, the color difference signals $E_I$ and $E_Q$ can be recorded and reproduced without being band-limited. Further, the color video signal can be recorded and reproduced satisfactorily in the form of a multiplexed signal of the time division multiplexed signal and the luminance signal, even in the VTR for home use having the relatively narrow recording and reproducing band. In addition, since both the color difference signal $E_I$ and the luminance signal $E_Y$ are not subjected to a time base compression at the time of the recording, a correlation exists between the color difference signal $E_I$ and the luminance signal $E_Y$. Thus, even in a case where there is small vertical correlation in the picture, the vertical direction differentiated component of the luminance signal $E_Y$ or the color difference signal $E_I$ mixing into the color difference signal $E_I$ or the luminance signal $E_Y$, is inconspicuous in the reproduced picture.

The compressed color difference signal $E_{QC}$ is multiplexed within the horizontal blanking period, but the horizontal synchronizing signal has a perfect vertical correlation. For this reason, the vertical direction differentiated component of the luminance signal $E_Y$ does not mix into the compressed color difference signal $E_{QC}$. On the other hand, the vertical direction differentiated component of the compressed color difference signal $E_{QC}$ does mix into the luminance signal, however, the noise caused by this vertical direction differentiated component is also generated within the horizontal blanking period and the noise will not appear in the reproduced picture because the compressed color difference signal $E_{QC}$ is multiplexed within the horizontal blanking period. A part of the compressed color difference signal $E_{QC}$ may be multiplexed slightly within the video period, but even in such a case, the noise caused by the mixing of the vertical direction differentiated component of the compressed color difference signal $E_{QC}$ into the luminance signal $E_Y$ only appears slightly in the side edge parts of the reproduced picture, and the noise is inconspicuous in the reproduced picture.

The present embodiment is not only applicable to the recording and reproduction of the NTSC system color video signal, and is also applicable to the recording and reproduction of a color video signal of other standard television systems such as the PAL system and the SECAM system. The two kinds of color difference signal $E_U$ and $E_V$ constituting the PAL system carrier chrominance signal, and the two kinds of color difference signals $D_R$ and $D_B$ constituting the SECAM system carrier chrominance signal, may be converted into the color difference signals $E_I$ and $E_Q$ by use of circuits such as matrix circuit, 1H delay circuit, and a switching circuit.

Next, description will be given with respect to a fourth embodiment of the recording and reproducing apparatus according to the present invention. The present embodiment is characterized in that a signal which is obtained by time base compressing the line-sequential color difference signal by 1/5 and then multiplexing the time base compressed line-sequential color difference signal within the horizontal blanking period of the non-compressed luminance signal, is recorded and reproduced. FIG. 12 shows a fourth embodiment of a recording system in the recording and reproducing apparatus according to the present invention. In FIG. 12, those parts which are the same as those corresponding parts in FIG. 1 are designated by the same reference numerals, and their description will be omitted. When an NTSC system color video signal shown in FIG. 13(A) is applied to the input terminal 11 shown in FIG. 12, the decoder 14 demodulates a carrier chrominance signal within the color video signal, and produces an I-signal $E_I$ shown in FIG. 13(C) and a Q-signal $E_Q$ shown in FIG. 13(D). As is well known, the I-signal and the Q-signal are color difference signals, and the color difference signals $E_I$ and $E_Q$ are applied to respective terminals 120a and 120b of a switching circuit 120.

On the other hand, a symmetrical square wave which is in phase with a horizontal synchronizing signal of a luminance signal $E_Y$ shown in FIG. 13(B) and has a period of 2H, is applied to the switching circuit 120 from the ½ frequency divider 21, as a switching pulse signal. Hence, the switching circuit 120 is controlled responsive to the switching pulse signal, and is alternately switched between the terminals 120a and 120b for every 1H. Accordingly, a line-sequential color difference signal in which the color difference signals $E_I$ and $E_Q$ are alternately multiplexed in time sequence for every 1H, is obtained from the switching circuit 120. This output line-sequential color difference signal of the switching circuit 120 is supplied to a terminal 121a of a switching circuit 121, and is also supplied to a terminal 121b of the switching circuit 121 through an inverter 122.

The switching circuit 121 is controlled responsive to an output symmetrical square wave of a ½ frequency divider 123. The output symmetrical square wave of the ½ frequency divider 123 is in phase with the horizontal synchronizing signal, and has a period of 4H. The switching circuit 121 alternately produces the input line-sequential color difference signal to the terminal 121a and the input inverted line-sequential color difference signal to the terminal 121b, for every 2H. Accordingly, the switching circuit 121 produces a time division multiplexed signal shown in FIG. 13(E). As shown in FIG. 13(E), the phase of the line-sequential color difference signal is inverted for every 2H in the time division multiplexed signal. In other words, the time division multiplexed signal is a signal in which the color difference signals $E_I$ and $E_Q$ and the inverted signals $\overline{E_I}$ and $\overline{E_Q}$ are successively multiplexed in time division for every 1H. The output time division multiplexed signal of the switching circuit 121 is supplied to a 1/5 time base compressing circuit 124.

As will be described later on in the specification, the present embodiment takes into consideration the color video signal having the small vertical correlation, so as to minimize the deterioration in the picture quality of the reproduced picture. The compressing circuit 124 is designed to time base compress the time base of signal parts in the time division multiplexed signal, within a section approximately equal to the effective horizontal scanning period and at least including the burst level transmission period, by 1/5. For example, the compressing circuit 124 compresses the time base of the signal parts within a section which is a sum of the effective horizontal scanning period and the back porch period, by 1/5. Further, the compressing circuit 124 transmits the time base compressed signal parts within the horizontal blanking period of the luminance signal. The effective horizontal scanning period excludes the horizontal blanking period of 10.5 μsec to 11.4 μsec of 1H (=63.5555 μsec), and is equal to 53.0555 μsec to 52.1555 μsec. When the time base of the signal parts within the section which is the sum of the effective horizontal scanning period and the back porch period, is compressed by 1/5, the compressed signal parts are transmitted within a time period of approximately 11.26 μsec to 11.83 μsec. Accordingly, in the case described above, the compressed signal parts are transmitted essentially within the horizontal blanking period. However, the compressed signal parts may be transmitted within a time period including the horizontal blanking period and a slight time period before or after or before and after the horizontal blanking period. In other words, the compressed signal parts may be transmitted within the horizontal blanking period and within a part of the video period of the luminance signal. However, even in such a case, the effects of the transmission of the compressed signal parts within a part of the video period of the luminance signal, only appear in the side edge parts of the reproduced picture, and no problems are introduced from the practical point of view.

The compressing circuit 124 may be constituted by charge transfer elements such as the CCDs, or by a digital circuit comprising an A/D converter, a RAM, and a D/A converter.

A time division multiplexed signal shown in FIG. 13(F) is obtained from the compressing circuit 124 and is supplied to the mixing circuit 23. The output time division multiplexed signal of the compressing circuit 124 is a signal in which time base compressed signals $E_{IC}$, $E_{QC}$, $\overline{E_{IC}}$, and $\overline{E_{QC}}$ of the color difference signals $E_I$ and $E_Q$ and the inverted signals $\overline{E_I}$ and $\overline{E_Q}$, are successively multiplexed in time division for every 1H. A time period $T_{11}$ shown in FIGS. 13(F) and 13(G) represents the horizontal blanking period, and a time period $T_{12}$ represents the effective horizontal scanning period. The mixing circuit 23 mixes the time division multiplexed signal shown in FIG. 13(F) within the horizontal blanking period $T_{11}$ of the non-compressed luminance signal $E_Y$ shown in FIG. 13(B) which is obtained from the lowpass filter 12 through the 1H delay circuit 22. Thus, the mixing circuit 23 produces a multiplexed color video signal shown in FIG. 13(G), and supplies this multiplexed color video signal to the processing circuit 24. At least a delay of H is introduced in the compressing circuit 124, and the 1H delay circuit 22 is provided so as to compensate for the time delay in the compressing circuit 124.

The processing circuit 24 produces a frequency modulated signal which is obtained by frequency-modulating a carrier by the multiplexed color video signal shown in FIG. 13(G). The output frequency modulated signal of the processing circuit 24 is supplied to rotary heads (not shown) through an output terminal 125, and is recorded on a magnetic tape (not shown).

Figure 14:
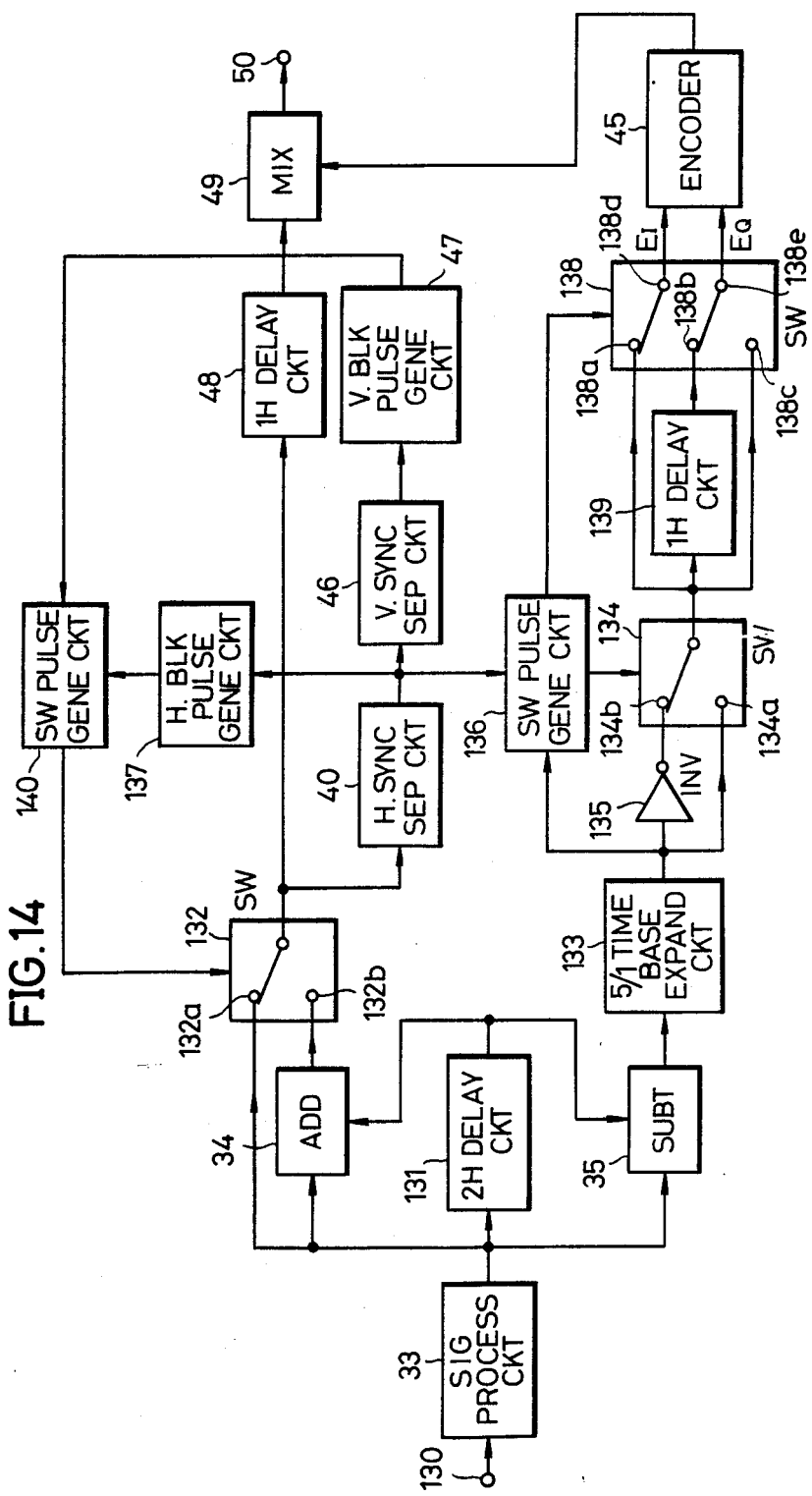
FIG. 14 is a systematic block diagram showing a fourth embodiment of a reproducing system in the recording and reproducing apparatus according to the present invention.

Next, description will be given with respect to a fourth embodiment of a reproducing system in the recording and reproducing apparatus according to the present invention, by referring to FIG. 14. In FIG. 14, those parts which are the same as those corresponding parts in FIG. 4 are designated by the same reference numerals, and their description will be omitted. The reproducing system shown in FIG. 14 is designed to reproduce the signals recorded on the magnetic tape by the recording system shown in FIG. 12. In FIG. 14, a reproduced signal which is reproduced from a magnetic tape (not shown) by rotary heads (not shown) and is applied to an input terminal 130, is the same as the frequency modulated signal which is produced through the output terminal 125 shown in FIG. 12. The reproduced signal is passed through the processing circuit 33, and is formed into a reproduced multiplexed color video signal shown in FIG. 13(G).

The reproduced multiplexed color video signal is supplied to the adding circuit 34, the subtracting circuit 35, a 2H delay circuit 131, and to a terminal 132a of a switching circuit 132. The reproduced multiplexed color video signal which is delayed by 2H in the 2H delay circuit 131, is supplied to the adding circuit 34 and to the subtracting circuit 35. The circuits 34, 35, and 131 constitute a comb filter circuit. A reproduced luminance signal within the reproduced multiplexed color video signal, is obtained from the adding circuit 34. A reproduced time division multiplexed signal shown in FIG. 13(F), is obtained from the subtracting circuit 35.

A more detailed description will be given with respect to the above. As described before, the reproduced time division multiplexed color video signal is a multiplexed signal of the reproduced luminance signal $E_Y$ and the reproduced time division multiplexed signal. When it is assumed that a signal $E_Y+\overline{E_{IC}}$ is reproduced in the (n−2)-th line (horizontal scanning line), a signal $E_Y+\overline{E_{QC}}$ is reproduced in the (n−1)-th line, a signal $E_Y+E_{IC}$ is reproduced in the n-th line, a signal $E_Y+E_{QC}$ is reproduced in the (n+1)-th line, a signal $E_Y+\overline{E_{IC}}$ is reproduced in the (n+2)-th line, . . . , the contents of the reproduced multiplexed color video signal, the output signal of the 2H delay circuit 131, the output signal of the adding circuit 34, and the output signal of the subtracting circuit 35 become as shown in the following table.

TABLE

| Line | Reproduced multiplexed color video signal | Output of 2H delay circuit 131 | Output of adding circuit 34 | Output of subtracting circuit 35 |
|---|---|---|---|---|
| n − 2 | $E_Y + \overline{E_{IC}}$ | $E_Y + E_{IC}$ | $2E_Y$ | $2\overline{E_{IC}}$ |
| n − 1 | $E_Y + \overline{E_{QC}}$ | $E_Y + E_{QC}$ | $2E_Y$ | $2\overline{E_{QC}}$ |
| n | $E_Y + E_{IC}$ | $E_Y + \overline{E_{IC}}$ | $2E_Y$ | $2E_{IC}$ |
| n + 1 | $E_Y + E_{QC}$ | $E_Y + \overline{E_{QC}}$ | $2E_Y$ | $2E_{QC}$ |
| n + 2 | $E_Y + \overline{E_{IC}}$ | $E_Y + E_{IC}$ | $2E_Y$ | $2\overline{E_{IC}}$ |
| n + 3 | $E_Y + \overline{E_{QC}}$ | $E_Y + E_{QC}$ | $2E_Y$ | $2\overline{E_{QC}}$ |
| n + 4 | $E_Y + E_{IC}$ | $E_Y + \overline{E_{IC}}$ | $2E_Y$ | $2E_{IC}$ |
| . | . | . | . | . |
| . | . | . | . | . |
| . | . | . | . | . |

As may be seen from the table above, the output signal of the adding circuit 34 is $2E_Y$ in all of the lines. The output signal of the subtracting circuit 35 is obtained in a sequence of $2\overline{E_{IC}} \rightarrow 2\overline{E_{QC}} \rightarrow 2E_{IC} \rightarrow 2E_{QC} \rightarrow 2\overline{E_{IC}} \rightarrow 2\overline{E_{QC}} \rightarrow$ . . . , and the output signal of the subtracting circuit 35 is a line-sequential color difference signal which is time base compressed by 1/5 and is phase inverted for every 2H. In other words, the output signal of the subtracting circuit 35 is the reproduced time division multiplexed signal shown in FIG. 13(F). The output reproduced time division multiplexed signal of the subtracting circuit 35, is supplied to a 5/1 time base expanding circuit 133 wherein the time base is expanded by 5. An output signal of the expanding circuit 133 is supplied to a terminal 134a of a switching circuit 134, a terminal 134b of the switching circuit 134 through an inverter 135, and to a switching pulse generating circuit 136. A reproduced horizontal synchronizing signal within the output reproduced luminance signal of the switching circuit 132, is separated in the horizontal synchronizing signal separating circuit 40, and is supplied to the switching pulse generating circuit 136. Accordingly, the switching pulse generating circuit 136 generates a symmetrical square wave which is in phase with the reproduced horizontal synchronizing signal and has a period of 4H, by detecting the burst levels (approximately "0.11" for the signal $E_{IC}$, "−0.17" for the signal $E_{QC}$, "−0.11" for the signal $\overline{E_{IC}}$, and "0.17" for the signal $\overline{E_{QC}}$) of the four kinds of reproduced compressed color difference signals. The output symmetrical square wave of the switching pulse generating circuit 136 is supplied to the switching circuit 134 as a switching pulse signal.

Thus, the switching circuit 134 alternately passes the input signals to the terminals 134a and 134b for every 2H. During a time period of 2H (for example, the lines n, n+1, n+4, n+5, . . .) in which the reproduced color difference signals $E_I$ and $E_Q$ are successively obtained, the switching circuit 134 remains connected to the terminal 134a. On the other hand, during a time period of 2H (for example, the lines n−2, n−1, n+2, n+3, . . .) in which the inverted reproduced color difference signals $\overline{E_I}$ and $\overline{E_Q}$ are successively obtained from the expanding circuit 133, the switching circuit 134 remains connected to the terminal 134b so as to pass the inverted reproduced color difference signals from the inverter 135. Therefore, a reproduced line-sequential color difference signal in which the phase inversion is eliminated in all of the lines, is obtained from the switching circuit 134.

The output reproduced line-sequential color difference signal of the switching circuit 134, is supplied to terminals 138a and 138c of a switching circuit 138, and to a terminal 138b of the switching circuit 138 through a 1H delay circuit 139. The switching circuit 138 is controlled responsive to an output symmetrical square wave of the switching pulse generating circuit 136 having a period of 2H. Hence, the switching circuit 138 is switched for every 1H so as to produce the input signals to the terminals 138a and 138b through output terminals 138d and 138e thereof during time periods of 1H in which the reproduced color difference signals $E_I$ and $\overline{E_I}$ are obtained from the expanding circuit 133, and to produce the input signals to the terminals 138b and 138c through the output terminals 138d and 138e thereof during time periods of 1H in which the reproduced color difference signals $E_Q$ and $\overline{E_Q}$ are obtained from the expanding circuit 133. Consequently, the reproduced color difference signal $E_I$ is produced through the output terminal 138d of the switching circuit 138, and the reproduced color difference signal $E_Q$ is produced through the output terminal 138e of the switching circuit 138.

The reproduced color difference signals $E_I$ and $E_Q$ within the reproduced line-sequential color difference signal, are obtained in parallel from the switching circuit 138 and are supplied to the encoder 45.

On the other hand, the output reproduced horizontal synchronizing signal of the horizontal synchronizing signal separating circuit 40, is converted in a horizontal blanking pulse generating circuit 137 into a horizontal blanking pulse signal which assumes a predetermined level during a time period corresponding to the horizontal blanking period. The horizontal blanking pulse signal is supplied to a switching pulse generating circuit 140. In addition, the vertical blanking pulse generating circuit 47 generates a vertical blanking pulse signal which assumes a predetermined level during a time period corresponding to the vertical blanking period, and supplied this vertical blanking pulse signal to the switching pulse generating circuit 140. Thus, the switching pulse generating circuit 140 generates a switching pulse signal which is in phase with both the horizontal blanking pulse signal and the vertical blanking pulse signal, and supplies the switching pulse signal to the switching circuit 132. As a result, the switching circuit 132 passes the reproduced multiplexed color video signal applied to the terminal 132a as the reproduced luminance signal, during the vertical blanking period of the reproduced luminance signal and during the effective horizontal scanning period which does not include the vertical blanking period and the horizontal blanking period. On the other hand, the switching circuit 132 passes the output reproduced luminance signal of the adding circuit 34 (that is, the output reproduced luminance signal of the comb filter circuit) applied to a terminal 132b of the switching circuit 132.

During the effective horizontal scanning period of the reproduced luminance signal, the switching circuit 132 selectively produces the output reproduced multiplexed color video signal of the processing circuit 33, which is the input signal to the comb filter circuit, as the reproduced luminance signal. On the other hand, during the horizontal blanking period, the switching circuit 132 produces the output reproduced luminance signal of the comb filter circuit. This is to prevent the deterioration in the vertical resolution of the picture of the reproduced luminance signal. When the reproduced luminance signal in the n-th line is represented by $E_{Yn}$, the output reproduced luminance signal of the comb filter circuit is $E_{Yn}+E_{Y(n-2)}$ in the n-th line, $E_{Y(n+1)}+E_{Y(n-1)}$ in the (n+1)-th line, $E_{Y(n+2)}+E_{Yn}$ in the (n+2)-th line, . . . . In other words, the output reproduced luminance signal of the comb filter circuit in the n-th line, is made up of the luminance signal of the n-th line and the luminance signal of the (n−2)-th line (that is, 2 lines before the line n). For this reason, when there is no vertical correlation in the picture, the vertical resolution becomes deteriorated by the above output reproduced luminance signal of the comb filter circuit. On the other hand, in the present embodiment, the time division multiplexed signal is not multiplexed within the effective horizontal scanning period of the reproduced multiplexed color video signal (or multiplexed within an extremely short time period of the effective horizontal scanning period such that the effect is negligible), as shown in FIG. 13(G). That is, in the n-th line, only the luminance signal of the n-th lines is transmitted. Accordingly, it is possible to prevent the deterioration in the vertical resolution by passing the reproduced multiplexed color video signal during the effective horizontal scanning period.

The time division multiplexed signal is multiplexed within the luminance signal during the horizontal blanking period, and the luminance signal needs to be separated by use of the comb filter circuit. Thus, the switching circuit 132 selectively passes the output reproduced luminance signal of the comb filter circuit. The vertical direction differentiated component (for example, a signal component which is a sum of the time division multiplexed signal in the n-th line and the inverted signal of the time division multiplexed signal in the (n−2)-th line) of the color difference signal which is obtained by demodulating the time division multiplexed signal, mixes into the luminance signal. However, the noise caused by the mixing of the vertical direction differentiated component into the luminance signal, is generated within the horizontal blanking period, and does not appear in the reproduced picture.

On the other hand, the time division multiplexed signal is a compressed line-sequential color difference signal in which the phase is inverted for every 2H. At the time of the reproduction, the time base of the compressed line-sequential color difference signal is expanded back into the original time base, and the phase inversion in the line-sequential color difference signal is eliminated so as to obtain a reproduced line-sequential color difference signal. The two kinds of reproduced color difference signals $E_I$ and $E_Q$ are obtained from the reproduced line-sequential color difference signal in parallel. Hence, in the reproduced color difference signals $E_I$ and $E_Q$, the same information is repeatedly reproduced in terms of 2 lines. Accordingly, when there is no vertical correlation in the picture, the vertical resolution will become deteriorated with respect to the color difference signals $E_I$ and $E_Q$. However, the deterioration in the vertical resolution of the color difference signals, is uneasily detected by the human eyes compared to the deterioration in the vertical resolution of the luminance signal, because of the spatial frequency response to the human eyes. For this reason, the deterioration in the vertical resolution of the color difference signals, does not introduced problems from the practical point of view. In addition, although the time division multiplexed signal (color difference signal) is multiplexed within the horizontal blanking period of the luminance signal, the horizontal synchronizing signal or the like within the luminance signal has a perfect vertical correlation. Therefore, a vertical direction differentiated component (for example, a signal component which is a difference between the luminance signals in the n-th and (n−2)-th lines) of the luminance signal does not mix into the color difference signals.

Between the odd and even fields, the phase of the vertical synchronizing signal differs by H/2 due to the interlaced scanning. For this reason, the switching circuit 132 is connected to the terminal 132a during the vertical blanking period so as to selectively produce the reproduced multiplexed color video signal. The phase of the vertical synchronizing signal will become distorted if the output reproduced luminance signal of the comb filter circuit is used during the vertical blanking period.

The output reproduced luminance signal of the switching circuit 132 is passed through the 1H delay circuit 48, so as to match the timing with the reproduced carrier chrominance signal which is at least delayed by 1H in the expanding circuit 133. The output reproduced luminance signal of the 1H delay circuit 48, is supplied to the mixing circuit 49.

In the recording system shown in FIG. 12, the phase of the line-sequential color difference signal is inverted for every 2H before being subjected to the time base compression. However, the line-sequential color difference signal may be subjected to the time base compression before the phase of the line-sequential color difference signal is inverted for every 2H. Moreover, two kinds of compressed color difference signals may be converted into a line-sequential color difference signal, and then subjected to the phase invertion for every 2H. In other words, the circuit simply needs to subject the line-sequential color difference signal to a time base compression and obtain the time division multiplexed signal in which the phase is inverted for every 2H. In the reproducing system, the circuit simply needs to eliminate the phase inversion in the reproduced time division multiplexed signal for every 2H and obtain the reproduced line-sequential color difference signal having the original time base. Hence, the expanding circuit 133 may be provided in a stage subsequent to the switching circuit 134. Further, a switching circuit may be provided in the transmission path between the output of the encoder 45 and the input of the mixing circuit 49, so as to block the transmission during a time period (a transmission period in which the vertical synchronizing signal and the equalizing pulse in the vicinity thereof are transmitted) in which the reproduced carrier chrominance signal originally does not exist.

The present embodiment is not only applicable to the recording and reproduction of the NTSC system color video signal, and is also applicable to the recording and reproduction of a color video signal of other standard television systems such as the PAL system and the SECAM system. When the present embodiment is applied to the recording and reproduction of the PAL system color video signal, a first color difference signal $E_U$ described by $0.493(E_B-E_Y)$ and a second color difference signal $E_V$ described by $0.877(E_R-E_Y)$ are obtained from the decoder 14 in the recording system, where $E_B$ and $E_R$ are primary color signals of blue and red which are gamma corrected, and $E_Y$ is the luminance signal which is described by the same generating equation as the luminance signal of the NTSC system color video signal. In the reproducing system, only slight modifications are required in the burst levels which are detected in the switching pulse generating circuit 136 and the construction of the encoder 45.

When the present embodiment is applied to the recording and reproduction of the SECAM system color video signal, the carrier chrominance signal is a line-sequential color difference signal. As is well known, this line-sequential color difference signal comprises a first frequency modulated color difference signal which is obtained by frequency-modulating a first carrier having a frequency of 4.40625 MHz by a color difference signal $D_R$ which is described by $-1.9(E_R-E_Y)$, and a second frequency modulated color difference signal which is obtained by frequency-modulating a second carrier having a frequency of 4.425 MHz by a color difference signal $D_B$ which is described by $1.5(E_B-E_Y)$. Accordingly, in the recording system, the circuit part made up of the decoder 14 and the switching circuit 120 simply needs to be changed to a frequency demodulator. On the other hand, in the reproducing system, the circuit part made up of the switching circuit 138, the 1H delay circuit 139, and the encoder 45 simply needs to be changed to a frequency modulator.

Color difference signals $(E_R-E_Y)$ and $(E_B-E_Y)$ may be separated and processed instead of the color difference signals $E_I$ and $E_Q$, so that the NTSC, PAL, and SECAM system color video signals can be recorded and reproduced with a common signal format, that is, so that compatibility is achieved among the NTSC, PAL, and SECAM system color video signals. In this case, a first matrix circuit is provided at the output stage of the decoder 14 in the recording system, so as to form the color difference signals $(E_R-E_Y)$ and $(E_B-E_Y)$ from the color difference signals $E_I$ and $E_Q$. In addition, a second matrix circuit is provided at the input stage of the encoder 45 in the reproducing system, so as to form the color difference signals $E_I$ and $E_Q$ from the color difference signals $(E_R-E_Y)$ and $(E_B-E_Y)$. In this case, the burst levels which are to be detected in the switching pulse generating circuit 136, must be changed to the burst levels of the color difference signals $(E_R-E_Y)$ and $(E_B-E_Y)$.

The present invention is not limited to the application to the VTR. For example, the present invention may be applied to an apparatus which records and reproduces signals on and from a recording medium which is in the form of a rotary magnetic sheet or disc.

Further, the present invention is not limited to these embodiments, but further variations and modifications may be made without departing from the scope of the present invention.

What is claimed is:

1. A multiplexed color video signal recording and reproducing apparatus comprising:

time division multiplexed signal producing means supplied with first and second color difference signals, for producing a time division multiplexed signal in which a time base compressed second color difference signal and one of a time base compressed first color difference signal and a time base non-compressed first color difference signal having a part thereof eliminated, are alternately multiplexed in time division for every predetermined time period, and in which the phase is inverted for every predetermined number of horizontal scanning periods;

first multiplexing means for multiplexing a time base non-compressed luminance signal and the time division multiplexed signal obtained from said time division multiplexed signal producing means, for producing a multiplexed color video signal, said time base non-compressed luminance signal comprising a time base non-compressed horizontal synchronizing signal and a time base non-compressed horizontal blanking signal;

recording means for recording the multiplexed color video signal obtained from said first multiplexing means on a recording medium;

reproducing means for reproducing the recorded signal from the recording medium so as to obtain a reproduced multiplexed color video signal;

comb filter circuit means supplied with the reproduced multiplexed color video signal obtained from said reproducing means, for separaing a reproduced time division multiplexed signal and a reproduced luminance signal from the reproduced multiplexed color video signal;

color difference signal reproducing circuit means for obtaining reproduced first and second color difference signal by switching the reproduced time division multiplexed signal from said comb filter circuit means based on a switching signal which is formed from a horizontal synchronizing signal within the reproduced luminance signal from said comb filter circuit means so as to eliminate the phase inversion, and by time base expanding the time base of the reproduced first and second color difference signals to the original time base;

encoder means for producing a carrier chrominance signal which is in conformance with a predetermined standard television system, from the reproduced first and second color difference signals obtained from said color difference signal reproducing circuit means; and second multiplexing means for multiplexing the reproduced luminance signal obtained from said comb filter circuit means and the carrier chrominance signal obtained from said encoder means, so as to produce a reproduced color video signal.

2. A recording and reproducing apparatus as claimed in claim 1 in which said time division multiplexed signal producing means comprises first and second time base compressing circuits for time base compressing the first color difference signal which has a band $BW_1$ and the second color difference signal which has a band $BW_2$, said first time base compressing circuit time base compressing the first color difference signal by $BW_1/(BW_1+BW_2)$ so as to produce a first time base compressed color difference signal, said second time base compressing circuit time base compressing the second color difference signal by $BW_2/(BW_1+BW_2)$ so as to produce a second time base compressed color difference signal, and a time division multiplexed signal generating circuit for producing a time division multiplexed signal in which the first and second time base compressed color difference signals from said first and second time base compressing circuits are alternately multiplexed in time division within one horizontal scanning period and in which the phase is inverted for every one horizontal scanning period, and said color difference signal reproducing circuit means comprises switching circuit means for alternately producing the reproduced time division multiplexed signal from said comb filter circuit means and a signal obtained by inverting the phase of the reproduced time division multiplexed signal for every one horizontal scanning period, responsive to the switching signal, a signal separating circuit for separating the first and second time base compressed color difference signals from the time division multiplexed signal which is eliminated of the phase inversion and is obtained from said switching circuit means, and first and second time base expanding circuits for independently time base expanding the time base of the first and second time base compressed color difference signals from said signal separating circuit to the original time base.

3. A recording and reproducing apparatus as claimed in claim 2 in which said switching circuit means is controlled responsive to the switching signal having a polarity determined by a signal which is obtained by detecting a burst level or a D.C. level of a color reference of an output signal of said first or second time base expanding circuit.

4. A recording and reproducing apparatus as claimed in claim 2 in which said first color difference signal is an I-signal, said second color difference signal is a Q-signal, said first time base compressing circuit time base compresses said I-signal by $\frac{3}{4}$, and said second time base compressing circuit time base compresses said Q-signal by $\frac{1}{4}$.

5. A recording and reproducing apparatus as claimed in claim 1 in which said time division multiplexed signal producing means comprises a time base compressing circuit for time base compressing at least a signal part within an effective horizontal scanning period and a signal part within a burst level transmission period of the second color difference signal into a time period within a horizontal blanking period of the luminance signal, a burst eliminating circuit for blocking transmission of a signal part within a burst level transmission period of the first color difference signal, and a time division multiplexed signal generating circuit for generating a time division multiplexed signal in which an output time base compressed second color difference signal of said time base compressing circuit is multiplexed in time division within a time period corresponding to a horizontal blanking period of an output time base non-compressed first color difference signal of said burst eliminating circuit and in which the phase is inverted for every one horizontal scanning period, and said color difference signal reproducing circuit comprises switching circuit means supplied with the reproduced time division multiplexed signal from said comb filter circuit means and responsive to the switching signal, for eliminating the phase inversion for every one horizontal scanning period and for independently separating the time base non-compressed first color difference signal and the time base compressed second color difference signal, and a time base expanding circuit for time base expanding the time base of the time base compressed second color difference signal obtained from said switching circuit means to the original time base so as to produce a reproduced signal of the second color difference signal.

6. A recording and reproducing apparatus as claimed in claim 5 in which said switching circuit means is controlled responsive to a first switching signal having a polarity determined by a signal which is obtained by detecting a burst level or a D.C. level of a color reference of the reproduced signal of the second color difference signal from said time base expanding circuit, so as to eliminate the phase inversion in the time division multiplexed signal for every one horizontal scanning period, and is controlled responsive to a second switching signal which is formed from the horizontal synchronizing signal of the reproduced luminance signal from said comb filter circuit means, so as to independently separate the time base non-compressed first color difference signal and the time base compressed second color difference signal.

7. A recording and reproducing apparatus as claimed in claim 5 in which said first color difference signal is an I-signal, said second color difference signal is a Q-signal, and said time base compressing circuit time base compresses the effective horizontal scanning period of said Q-signal by approximately 1/5.

8. A recording and reproducing apparatus as claimed in claim 5 in which said comb filter circuit means is inoperative during a vertical blanking period of the reproduced luminance signal, and produces the reproduced multiplexed color video signal as the reproduced luminance signal during the vertical blanking period of the reproduced luminance signal.

9. A recording and reproducing apparatus as claimed in claim 1 in which said time division multiplexed signal producing means comprises a line-sequential color difference signal generating circuit for generating a line-sequential color difference signal in which the first and second color difference signals are alternately multiplexed in time sequence, and a time division multiplexed signal generating circuit supplied with the line-sequential color difference signal from said line-sequential color difference signal generating circuit, for generating a time division multiplexed signal in which a signal part at least within a time period approximately equal to an effective horizontal scanning period including a burst level or a D.C. level of a color reference is time base compressed within a time period approximately corresponding to a horizontal blanking period of the luminance signal and in which the phase is inverted for every two horizontal scanning periods, said first multiplexing means multiplexes the time division multiplexed signal at least within the horizontal blanking period of the luminance signal, and said second multiplexing means comprises switching circuit means for selectively producing the multiplexed color video signal as the reproduced luminance signal at least during the effective horizontal scanning period of the reproduced luminance signal, and for selectively producing the output reproduced luminance signal of said comb filter circuit means during the horizontal blanking period, and a mixing circuit for mixing an output signal of said switching circuit means and the carrier chrominance signal obtained from said encoder means.

10. A recording and reproducing apparatus as claimed in claim 9 in which said switching circuit means selectively produces the multiplexed color video signal as the reproduced luminance signal during a vertical blanking period.

11. A recording and reproducing apparatus as claimed in claim 9 in which said color difference signal reproducing circuit means is controlled responsive to the switching signal having a polarity determined by a signal which is obtained by detecting a burst level or a D.C. level of a color reference of the reproduced time division multiplexed signal, so as to eliminate the phase inversion in the reproduced time division multiplexed signal for every two horizontal scanning periods.

* * * * *